United States Patent
Ueda et al.

[11] Patent Number: 6,066,712
[45] Date of Patent: May 23, 2000

[54] STYRYL POLYMER, PRODUCTION METHOD AND USE THEREOF

[75] Inventors: Hideaki Ueda, Kishiwada; Takeshi Kitahora, Amagasaki; Tsuyoshi Nozaki, Sakai, all of Japan

[73] Assignee: Minolta Co., Ltd., Osaka, Japan

[21] Appl. No.: 09/074,914

[22] Filed: May 8, 1998

[30] Foreign Application Priority Data

May 9, 1997 [JP] Japan ................................. 9-119192
May 9, 1997 [JP] Japan ................................. 9-119194

[51] Int. Cl.$^7$ .......................... C08G 10/02; C08G 79/02
[52] U.S. Cl. ...................... 528/244; 528/398; 528/422; 430/58; 430/59
[58] Field of Search ................................. 528/244, 422, 528/398; 430/58, 59

[56] References Cited

U.S. PATENT DOCUMENTS

| | | | |
|---|---|---|---|
| 4,971,874 | 11/1990 | Ueda | 430/58 |
| 5,413,887 | 5/1995 | Ueda | 430/58 |

FOREIGN PATENT DOCUMENTS

| | | |
|---|---|---|
| 8-282349 | 10/1992 | Japan . |
| 05247460 | 9/1993 | Japan . |
| 05311163 | 11/1993 | Japan . |
| 07053953 | 2/1995 | Japan . |

OTHER PUBLICATIONS

"Organic Electroluminescent Diodes", C.W. Tang and S.A. VanSlyke, American Institute of Physics, App. Phys. Lett. 51 (12), Sep. 21, 1987.

*Primary Examiner*—Duc Truong
*Attorney, Agent, or Firm*—Morrison & Foerster LLP

[57] ABSTRACT

The present invention relates to a styryl polymer, represented by the following formula (I) or (II), a production method thereof and use thereof to a photosensitive member and a electroluminescence element:

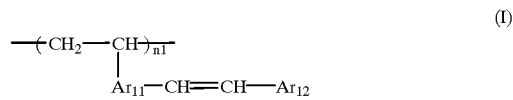

in which $Ar_{11}$ is an arylene group which may have a substituent; $Ar_{12}$ is an aryl group, a polycondensed ring group or a heterocyclic ring group; $n_1$ is a natural number;

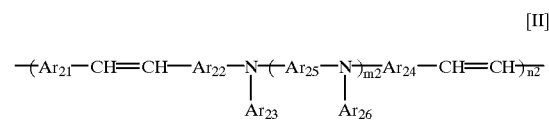

in which $Ar_{21}$, $Ar_{22}$, and $Ar_{24}$ are respectively an arylene group which may have a substituent; $Ar_{25}$ is an arylene group or a bivalent polycondensed ring group, which may have a substituent; $Ar_{23}$ and $Ar_{26}$ are respectively an alkyl group, an aralkyl group or an aryl group, which may have a substituent; $m_2$ is 0, 1, 2 or 3; $n_2$ is a natural number.

8 Claims, 2 Drawing Sheets

STYRYL POLYMER, PRODUCTION METHOD AND USE THEREOF

This application is based on application(s) No. Hei 09-119,192 and Hei 09-119,194, respectively filed on May 9, 1997 in Japan, the contents of which are hereby incorporated by reference.

BACKGROUND OF THE INVENTION

1. Field of the Invention

The present invention relates to a new styryl polymer having charge-transporting ability and/or photoconductive ability, a production method thereof. Further the present invention provides an organic electrolumnescense element and photosensitive member in application of the styryl polymer compound.

2. Description of the Prior Art

Organic materials having charge-transporting ability or photoconductive ability have many advantages such as low cost, possibility of many processings and no pollution. Many such compounds are proposed, such as oxadiazole, hydrazones, pyrazolines, oxazoles, arylamines, benzidines, stilbenes, butadienes.

There are proposed a photosensitive member and organic photosensitive member using the above characteristics of organic compounds.

The electrophotographic system is one of image forming methods invented by Carlson. This system comprises electrically charging a photosensitive member by means of corona discharge, irradiating the photosensitive member according to the images to form electrostatic latent images, adhering toner particles to the electrostatic latent images for developing and transferring toner particles to paper.

Basic characteristics required for such a photosensitive member in electrophotography is as follows; an adequate potential is kept in the dark, few electrocharges are scattered and electrocharges can be dissipated rapidly by photoirradiation.

Conventional photosensitive members use inorganic photoconductive materials such as selenium, selenium alloy, cadmium sulfide or zinc oxide. These photoconductive materials have many advantages such as durability with respect to copy. However, they have disadvantages such as high production costs are low processability and poison.

In order to overcome the above disadvantages, organic photoconductor are developed. A photosensitive member using the conventional organic photoconductive materials as a charge transporting material are, however, not satisfactory in electrophotographic characteristics such as chargeability, sensitivity and residual potential. It is desired that charge transporting materials excellent in charge-transporting ability and durability are developed.

As a technique using charge-transporting ability of organic materials, organic electroluminescence element is known. Such a organic electroluminescence element is studied enthusiastic because it may be a full-color solid-type large display of low cost.

In general, the organic electroluminescence element is composed of a luninous layer and a pair of electrodes sandwiching the luninous layer. When voltage is applied to the electrodes, electrons are injected from cathode and holes are injected from anode. The electrons and hole are recombined in the luninous layer. Energy level is return from conductive band to valence band to emit light as luminescence.

Conventional organic electroluminescence elements has high driving voltage, poor luminous brightness And low luninous efficiency, compared with inorganic electroluminescence elements. Deterioration of characteristics are remarkable, resulting in failure to put it into practical use.

Recently attention is paid to organic electroluminescence element with thin layers laminated, which contains organic materials showing high fluorescent quantum yield at low voltage of 10 V or less to emit light, being reported by Applied Physics Letters, Vol. 51, page 913, 1998.

In the report, a metal chelate compound is contained in fluorescent layer and amine compound is contained in a hole-injecting layer, resulting in achievement of green color light emmision of high brightness, and showing several hundreds of brightness (cd/m$^2$) and maximum luminous efficiency of 1.51 m/W. This performance is nearly practical.

Conventional organic electroluminescence element has been improved in luminous strength through improvement of construction. However, satisfactory brightness has not been achieved yet. There is also a big problem on stability when repeatedly used.

Therefore, a charge transporting material with excellent charge transporting ability and durability is desired to be developed in order to develop organic electroluminescence elements having higher luminous brightness and stability when repeatedly used.

SUMMARY OF THE INVENTION

An object of the present invention is to provide novel organic compound useful for charge transporting material excellent in durability.

Another object of the present invention is to provide a production method of the novel organic compound.

Further object of the present invention is to provide an organic photosensitive member and an organic electroluminescence element, being composed of the novel organic compound.

The present invention provides a styryl polymer, represented by the following formula (I) or (II), a production method thereof and use thereof to a photosensitive member and a electroluminescence element:

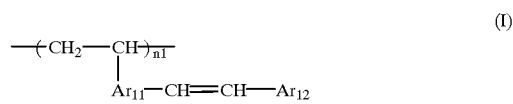

in which $Ar_{11}$ is an arylene group which may have a substituent; $Ar_{12}$ is an aryl group, a polycondensed ring group or a heterocyclic ring group; $n_1$ is a natural number;

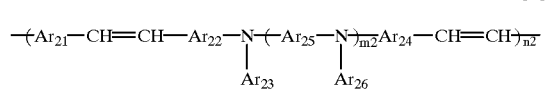

in which $Ar_{21}$, $Ar_{22}$, and $Ar_{24}$ are respectively an arylene group which may have a substituent; $Ar_{25}$ is an arylene group or a bivalent polycondensed ring group, which may have a substituent; $Ar_{23}$ and $Ar_{26}$ are respectively an alkyl group, an aralkyl group or an aryl group, which may have a substituent; $m_2$ is 0, 1, 2 or 3; $n_2$ is a natural number.

DETAILED DESCRIPTION OF THE INVENTION

Figure 1:
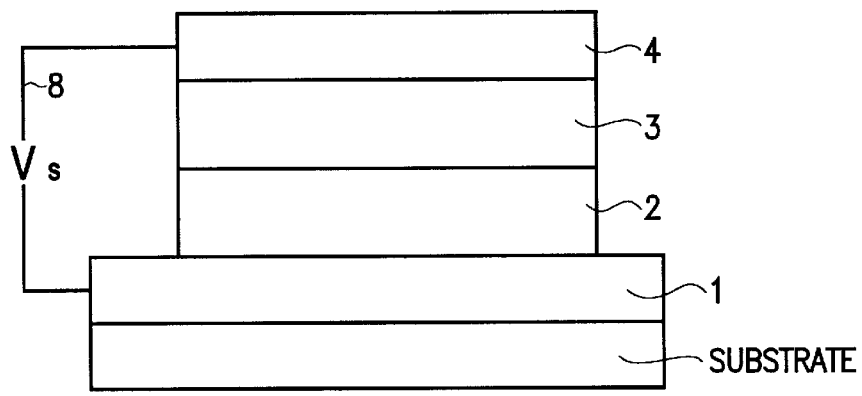
FIG. 1 is a schematic sectional view illustrating one embodiment of organic electroluminescence elements.

The present invention relates to a styryl polymer, represented by the following formula (I) or (II), a production method thereof and use thereof to a photosensitive member and a electroluminescence element:

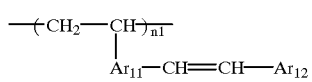
(I)

in which $Ar_{11}$ is an arylene group which may have a substituent; $Ar_{12}$ is an aryl group, a polycondensed ring group or a heterocyclic ring group; $n_1$ is a natural number;

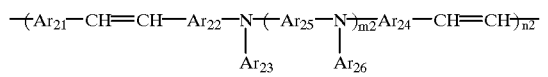
[II]

in which $Ar_{21}$, $Ar_{22}$, and $Ar_{24}$ are respectively an arylene group which may have a substituent; $Ar_{25}$ is an arylene group or a bivalent polycondensed ring group, which may have a substituent; $Ar_{23}$ and $Ar_{26}$ are respectively an alkyl group, an aralkyl group or an aryl group, which may have a substituent; $m_2$ is 0, 1, 2 or 3; $n_2$ is a natural number.

In the general formula (I), $Ar_{11}$ is an arylene group such as phenylene and diphenylene, which may have a substituent. $Ar_{12}$ is an aryl group such as phenyl and dipehnyl, a heterocyclic ring group such as

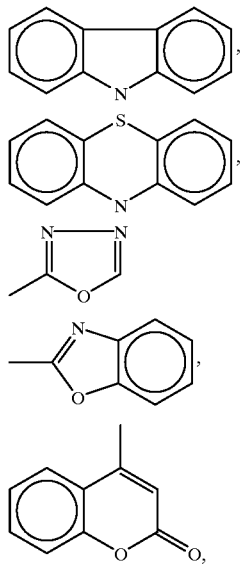

-continued

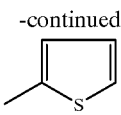

or a polycondensed ring group such as

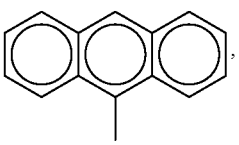

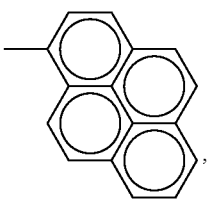

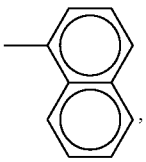

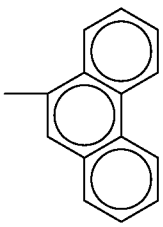

$Ar_{12}$ may have a substituent such as an alkyl group, an alkoxy group, a styryl group, a heterocylcic ring group and a diphenylamino group. In the general formula (I), $n_1$ is a natural number, having particular limitation of about 5 to 1,000, preferably 5 to 500.

The styryl polymer compound represented by the general formula (I) may be produced by a known method. For example, the styryl Polymer compound (I) can be produced by treating a phosphorous compound represented by the following formula (III);

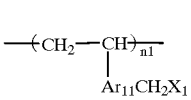
(III)

in which $Ar_{11}$ and $n_1$ are the same as above; $X_1$ is $PO(OR_{11})_2$ or $P(R_{12})_3Y_1$ (in which $R_{11}$ is a lower alkyl group, $R_{12}$ is a cycloalkyl group or an aryl group; $Y_1$ is a halogen atom) with an aldehyde compound represented by the following formula (IV)

$Ar_{12}$—CHO (IV)

in which $Ar_{12}$ is the same as above.

The styryl polymer compound (I) can be also produced by treating an aldehyde compound represented by the following formula (V);

$$-\!\!\!-\!\!(CH_2-CH)_{n1}-\!\!\!-\quad\quad (V)$$
$$\quad\quad |$$
$$\quad\quad Ar_{11}CHO$$

in which $Ar_{11}$ and $n_1$ are the same as above, with a phosphorous compound represented by the following formula (VI);

$$Ar_{12}-CH_2X_1 \quad\quad (VI)$$

in which $Ar_{12}$ is the same as above; $X_1$ is $PO(OR_{11})_2$ or $P(R_{12})_3Y_1$ (in which $R_{11}$ is a lower alkyl group, $R_{12}$ is a cycloalkyl group or an aryl group; $Y_1$ is a halogen atom).

The compound represented by the general formula (III) or (V) can be prepared easily or available in the market. In the general formula (III) or (V), $n_1$ may be, for example, between 5 to 1,000.

In the present invention, specific examples of the styryl polymer compound represented by the general formula (I) to be used include the following. However, it should not be construed that the scope of the present invention is limited to these examples.

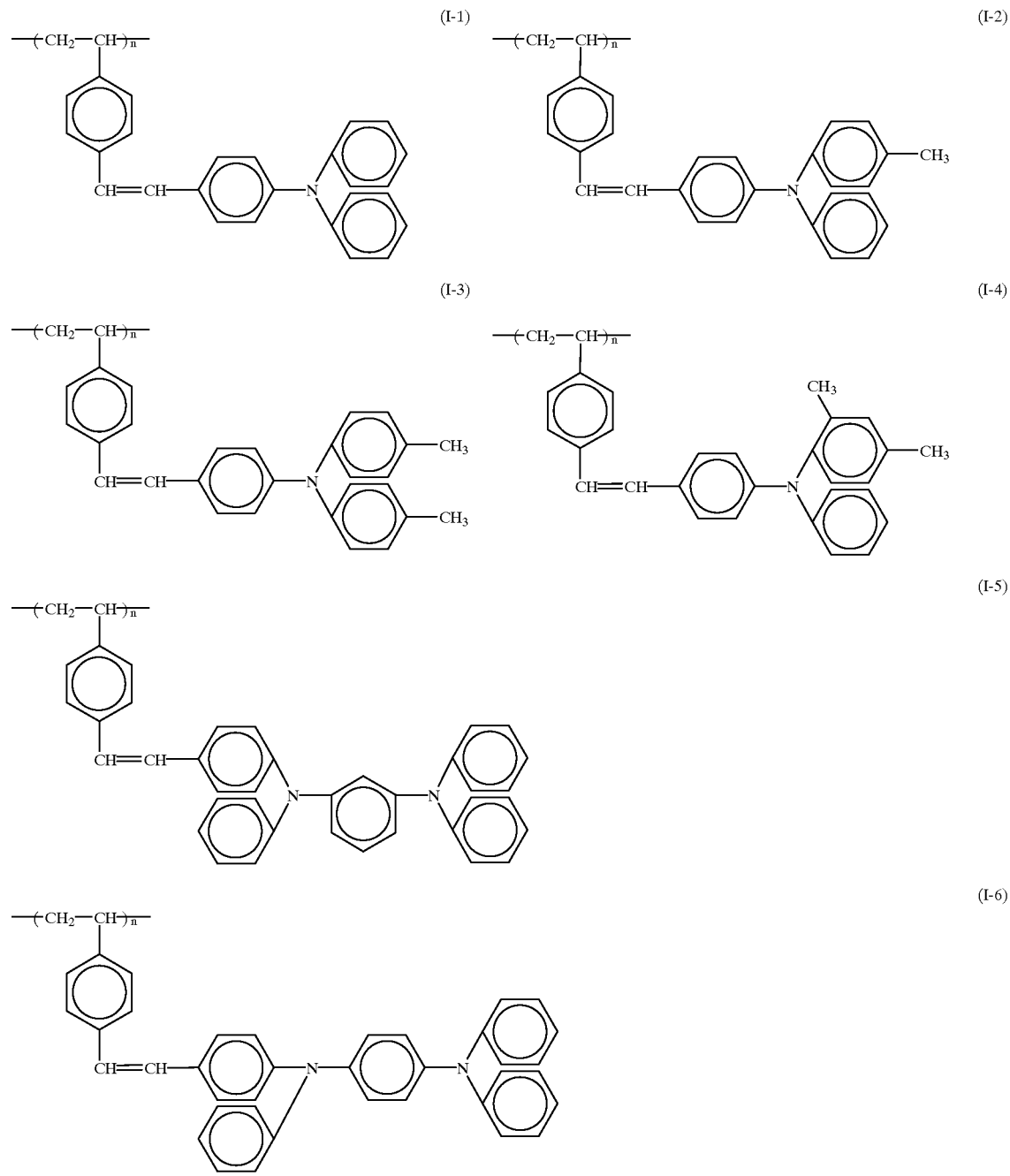

-continued
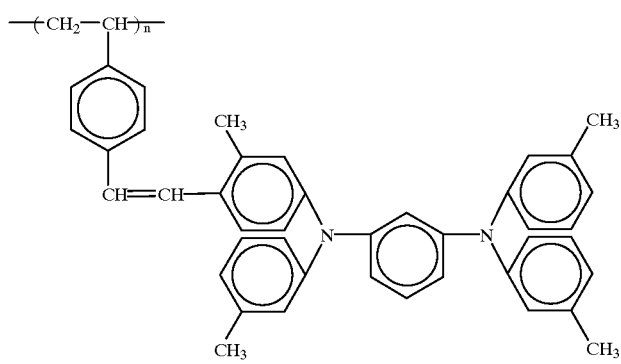
(I-7)
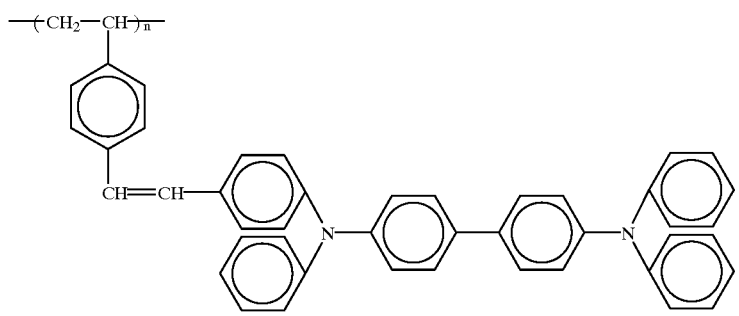
(I-8)
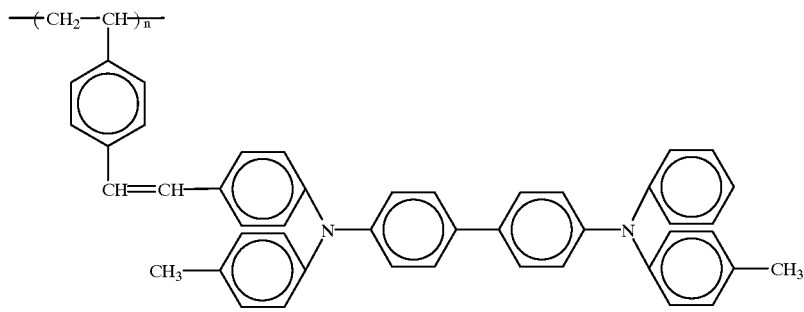
(I-9)
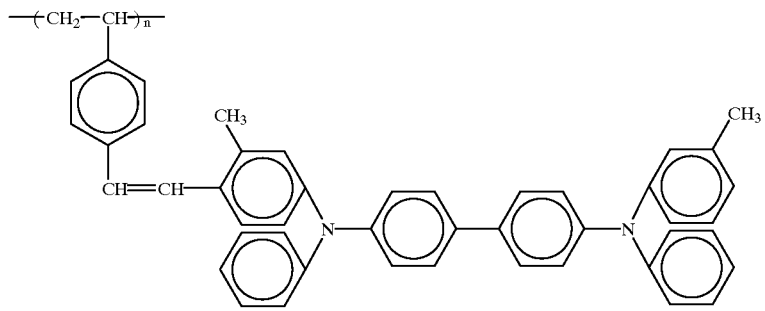
(I-10)

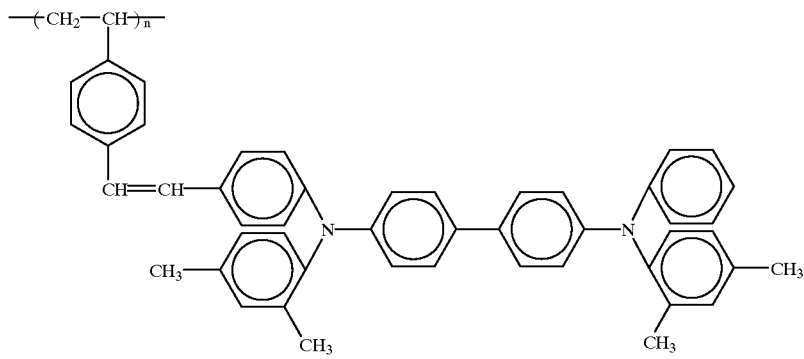
(I-11)
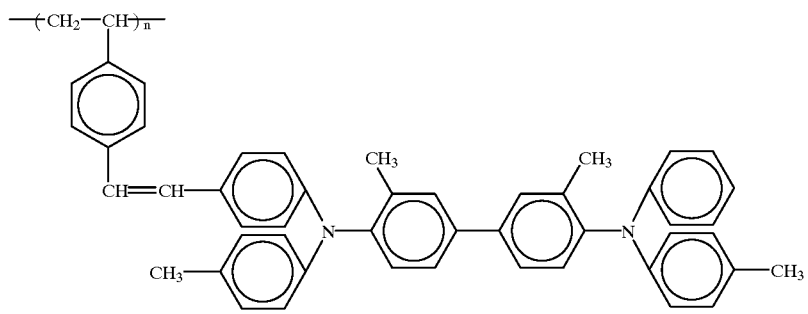
(I-12)
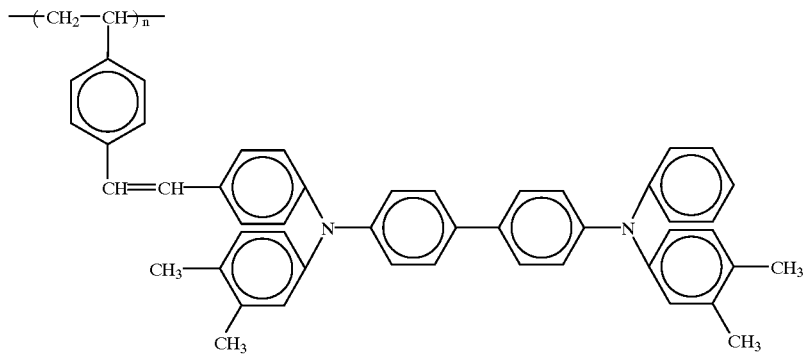
(I-13)
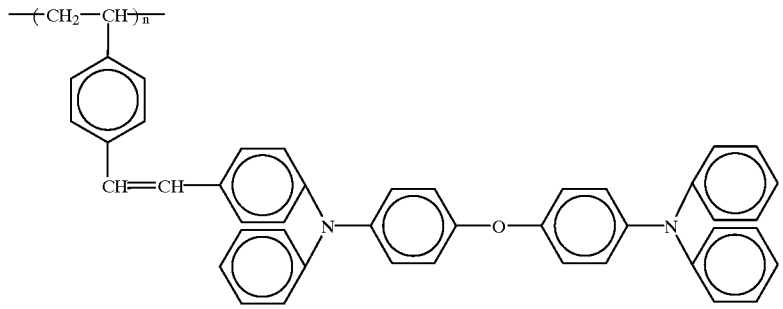
(I-14)

(I-15)
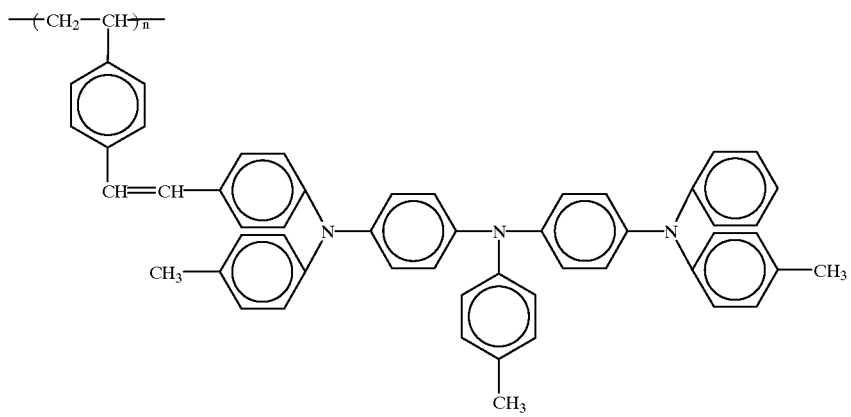
(I-16) (I-17)
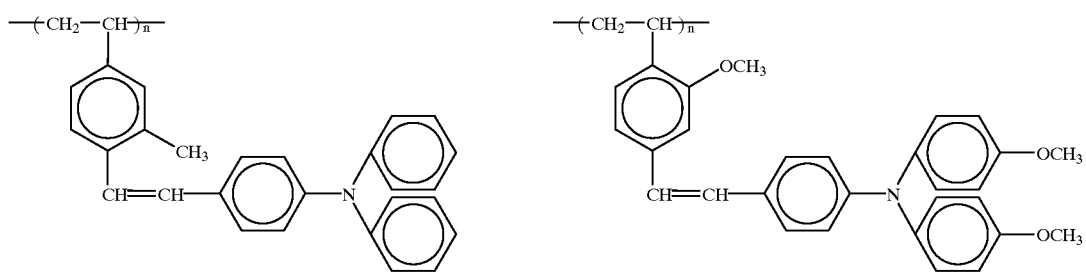
(I-18)
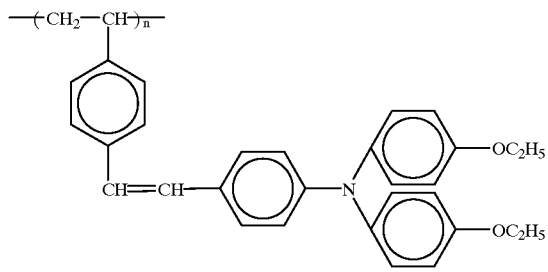
(I-19) (I-20)
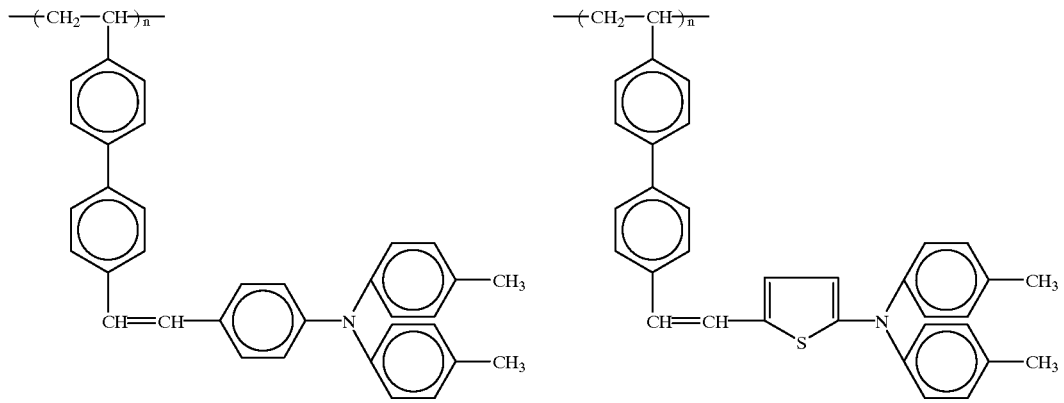

-continued
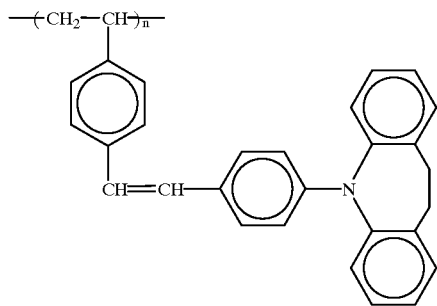 (I-21)
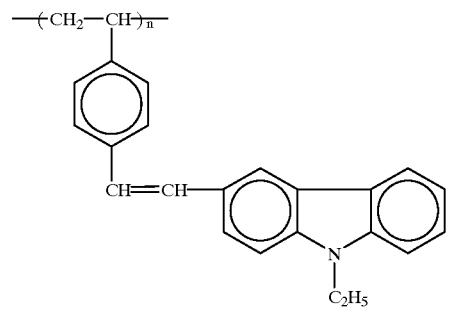 (I-22)
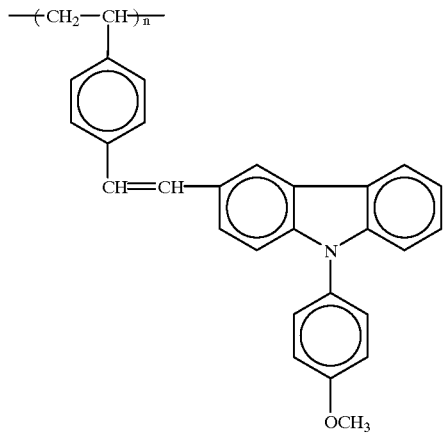 (I-23)
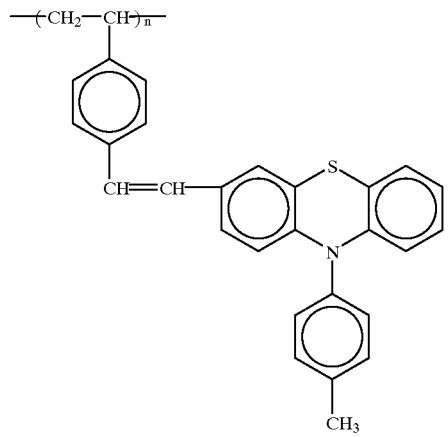 (I-24)
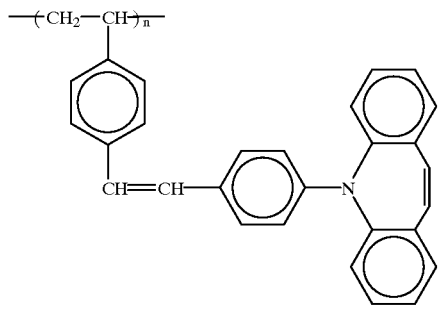 (I-25)
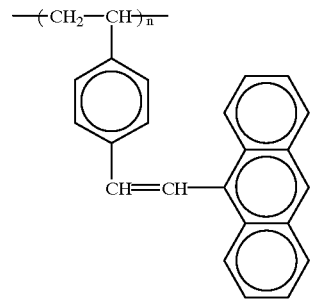 (I-26)
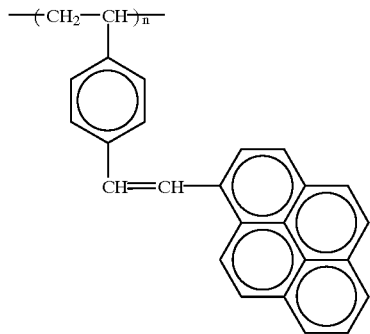 (I-27)
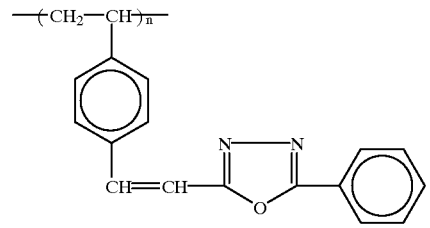 (I-28)

-continued
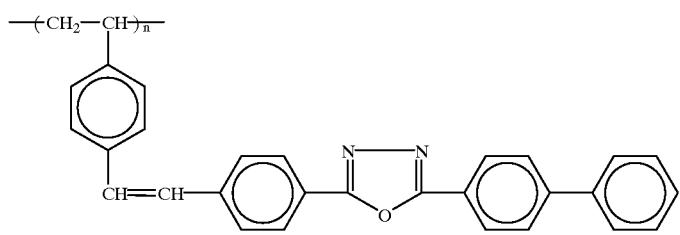
(I-29)
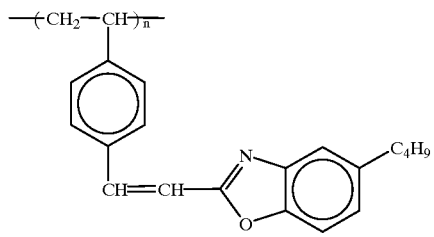
(I-30)
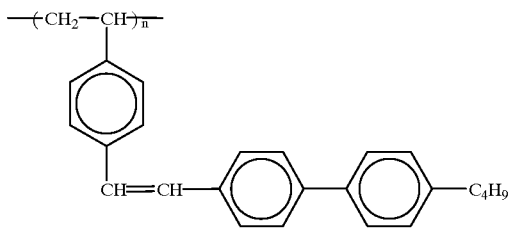
(I-31)
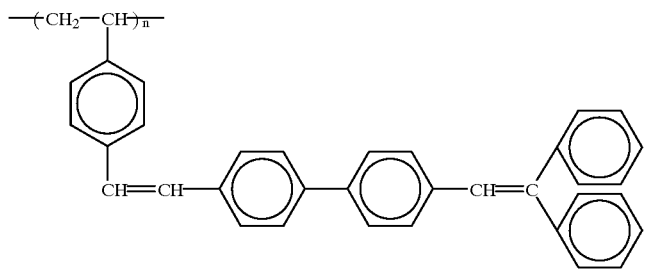
(I-32)
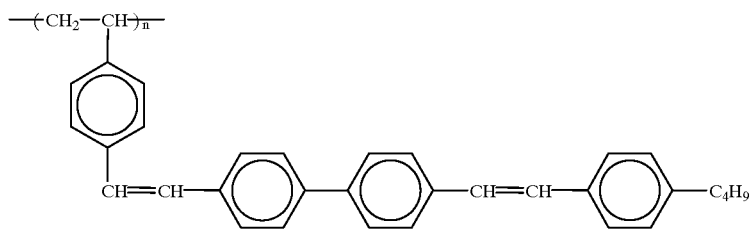
(I-33)
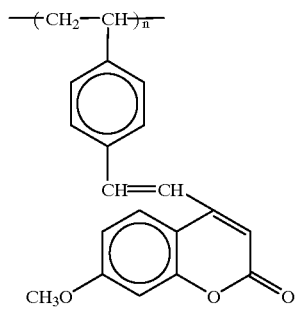
(I-34)
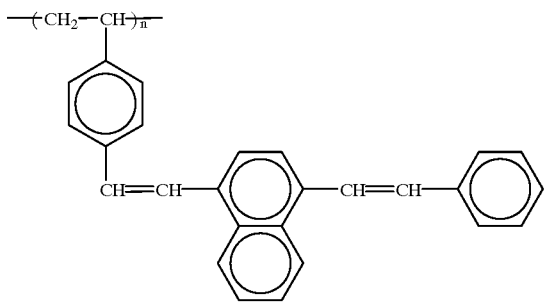
(I-35)

(I-36) 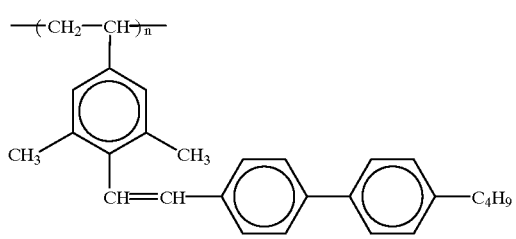

(I-37) 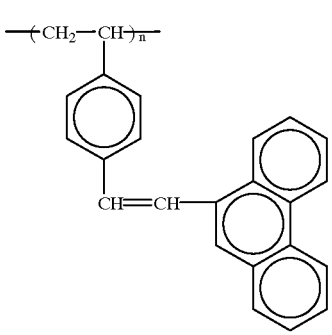

(I-38) 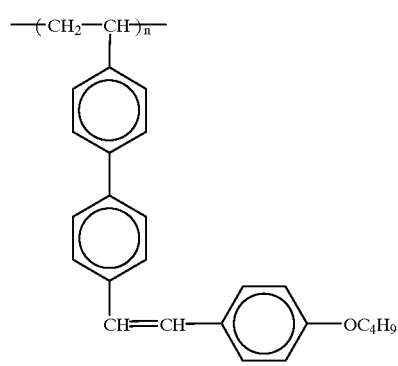

(I-39) 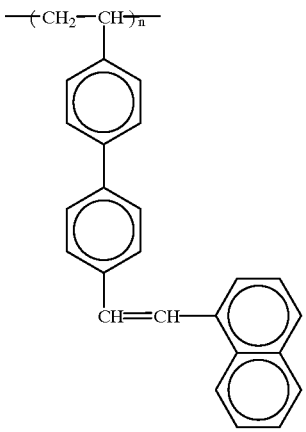

(I-40) 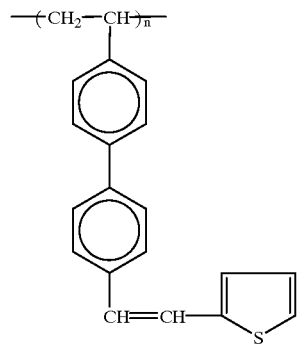

In the general formula (II), $Ar_{21}$, $Ar_{22}$, and $Ar_{24}$ are respectively an arylene group such as phenylene and diphenylene, which may have a substituent such as an lower alkyl group and a lower alkoxyl group. Preferred one is a phenylene group, a diphenylene group, a phenylene group having a an lower alkyl group and a lower alkoxyl group as a substituent or a diphenylene group having a lower alkyl group and a lower alkoxyl group as a substituent.

$Ar_{25}$ is an arylene group such as phenylene and diphenylene or a bivalent polycondensed ring group, such as

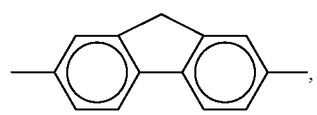

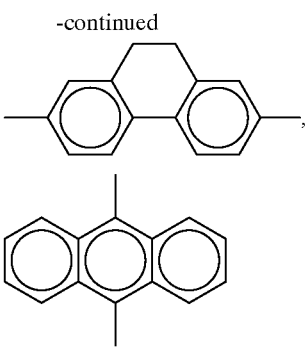

Those groups may have a substituent such as an lower alkyl and an lower alkoxy group. Preferred one is a penylene group or a diphenylene group.

$Ar_{23}$ and $Ar_{26}$ are respectively an alkyl group such as methyl, an aralkyl group such as benzyl or an aryl group such as phenyl and diphenyl. Those groups may have a lower alkyl group and a lower alkoxyl group as a substituent. Preferred one is a phenyl group or a diphenyl group. $m_2$ is 0, 1, 2 or 3, preferably 0 or 1.

$n_2$ is a natural number having particular limitation but 5 to 1,000, preferably 10 to 1,000, depending on compounds or conditions used in preparation of the compound (II).

The styryl polymer compound represented by the general formula (II) may be produced by a known method. For example, the styryl polymer compound (II) can be produced by treating a phosphorous compound represented by the following formula (VII);

$$X_2-CH_2-Ar_{21}-CH_2-X_2 \qquad [VII]$$

in which $Ar_{21}$ is the same as above; $X_2$ is $PO(OR_{21})_2$ or $P(R_{22})_3Y_2$ (in which $R_{21}$ is a lower alkyl group, $R_{22}$ is a cycloalkyl group or an aryl group; $Y_2$ is a halogen atom) with an aldehyde compound represented by the following formula (VIII)

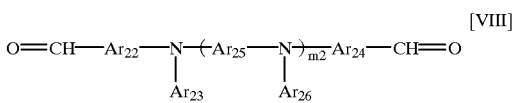

[VIII]

in which $Ar_{22}$, $Ar_{23}$, $Ar_{24}$, $Ar_{25}$, $Ar_{26}$, and $m_2$ are the same as above The compound represented by the general formula (VII) or (VIII) can be prepared easily or available in the market.

In the present invention, specific examples of the styryl polymer compound represented by the general formula (II) to be used include the following. However, it should not be construed that the scope of the present invention is limited to these examples.

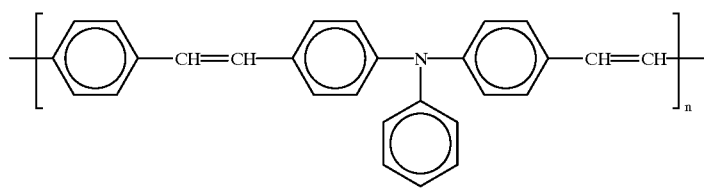

(II-1)

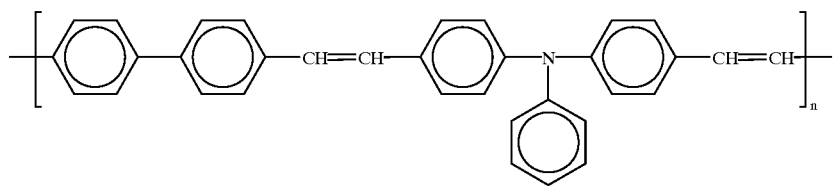

(II-2)

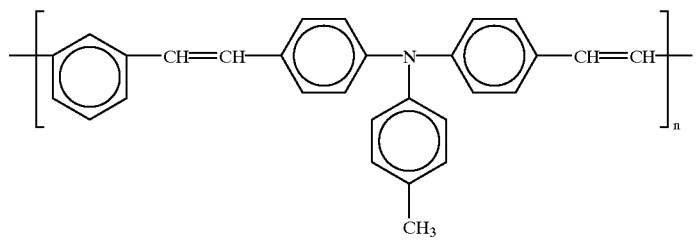

(II-3)

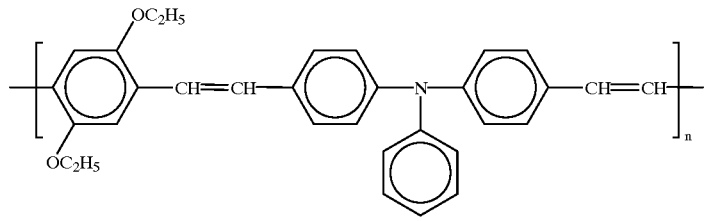

(II-4)

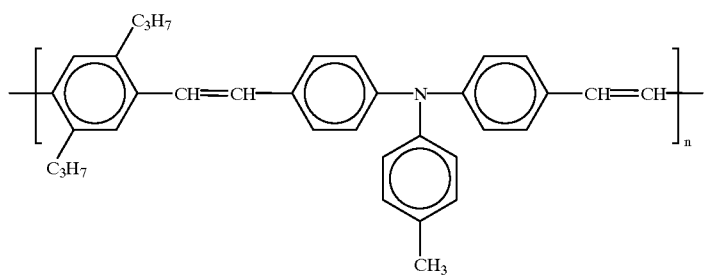
(II-5)
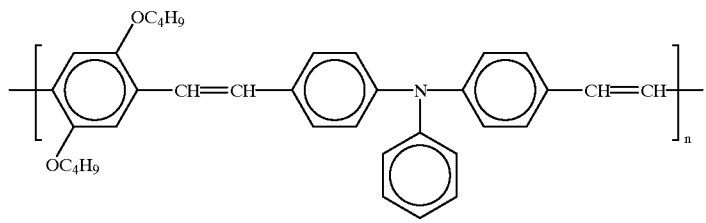
(II-6)
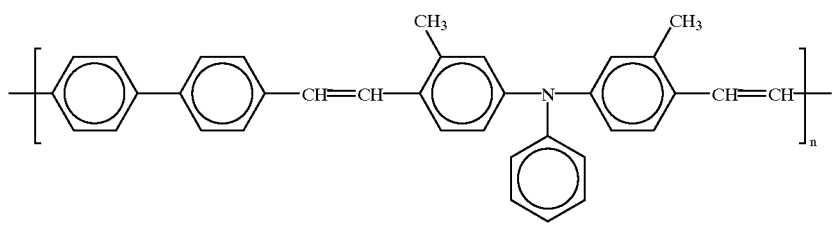
(II-7)
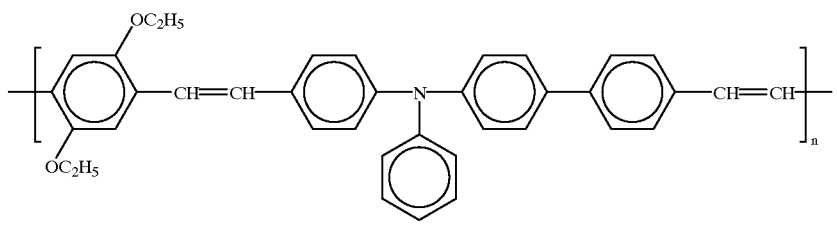
(II-8)
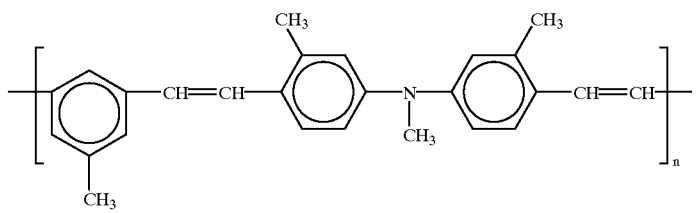
(II-9)
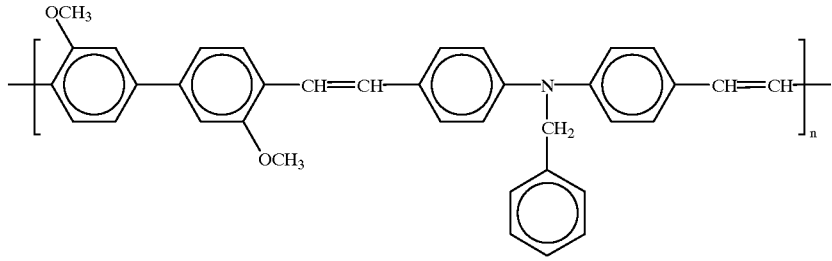
(II-10)

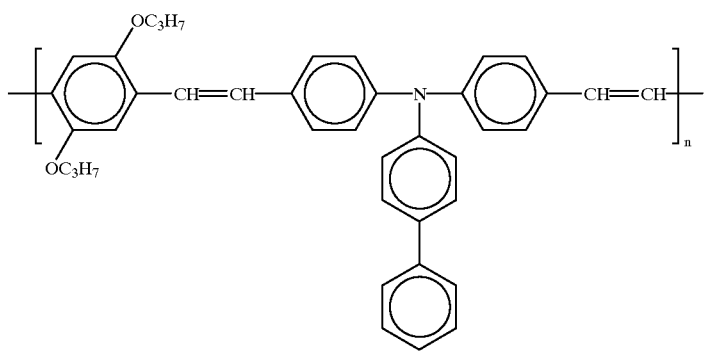
(II-11)
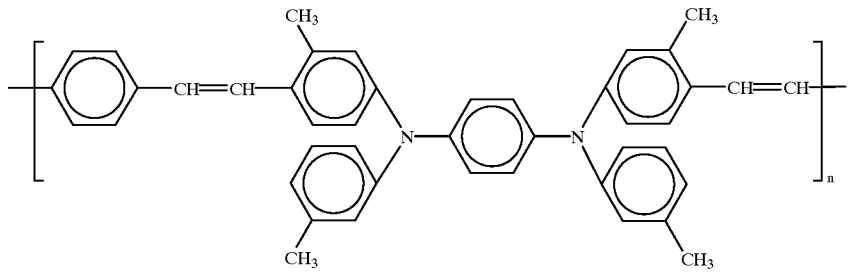
(II-12)
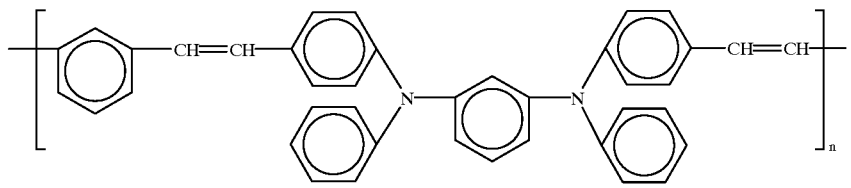
(II-13)
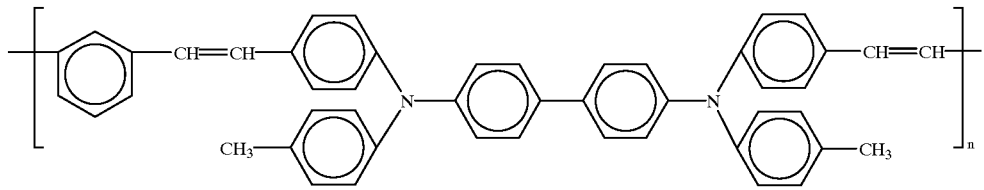
(II-14)
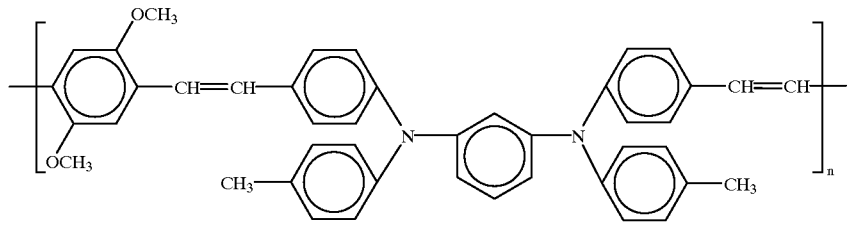
(II-15)
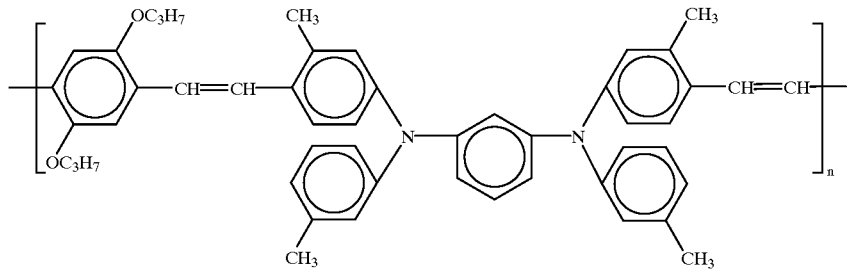
(II-16)

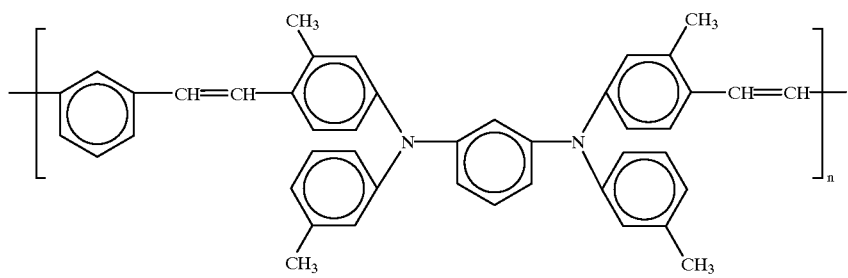
(II-17)
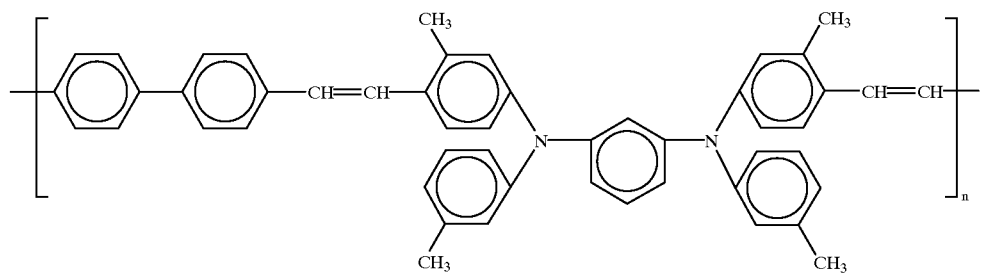
(II-18)
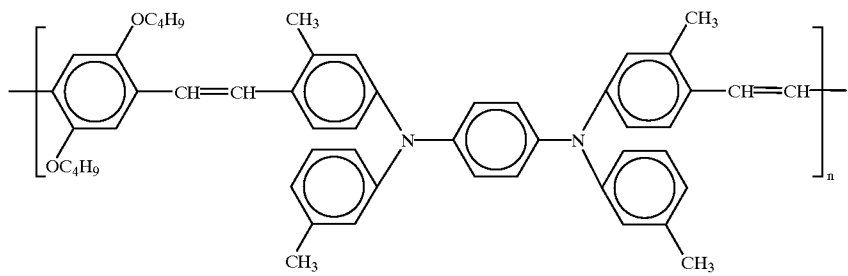
(II-19)
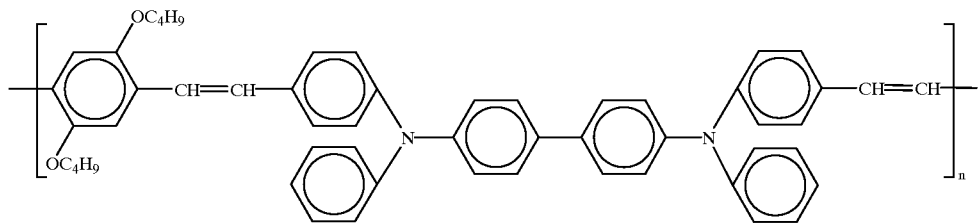
(II-20)
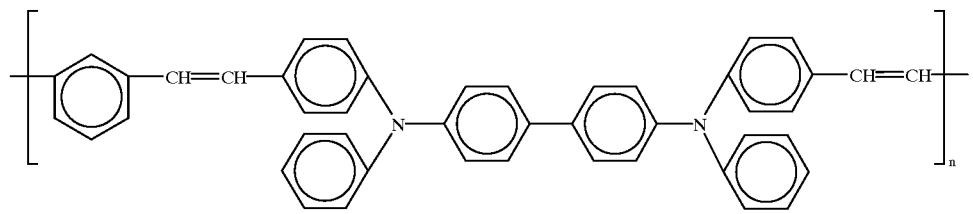
(II-21)
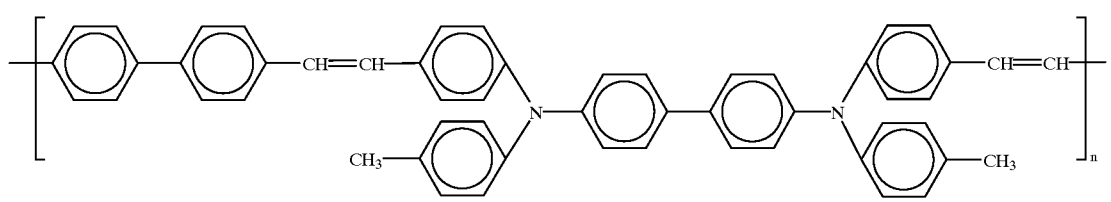
(II-22)

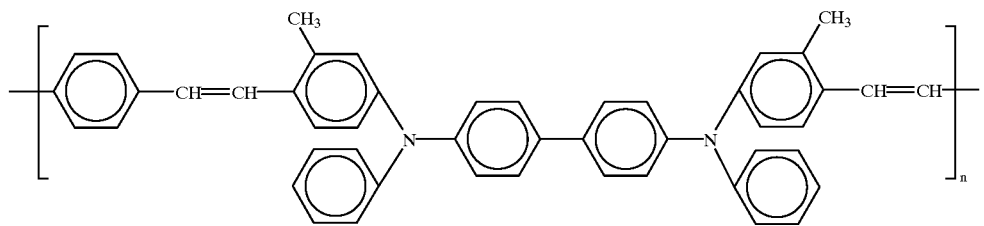
(II-23)
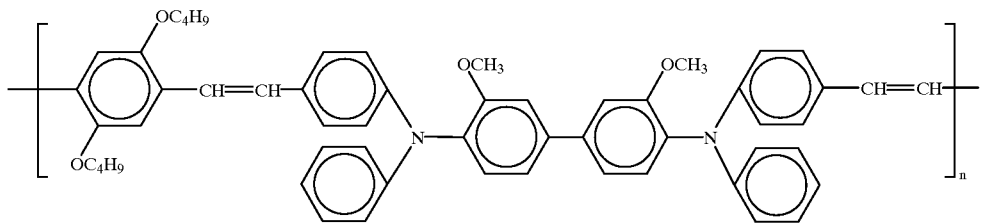
(II-24)
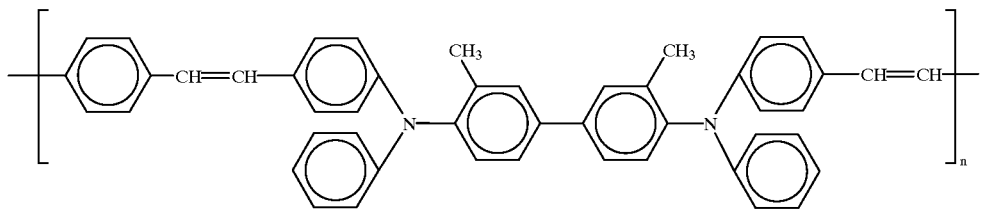
(II-25)
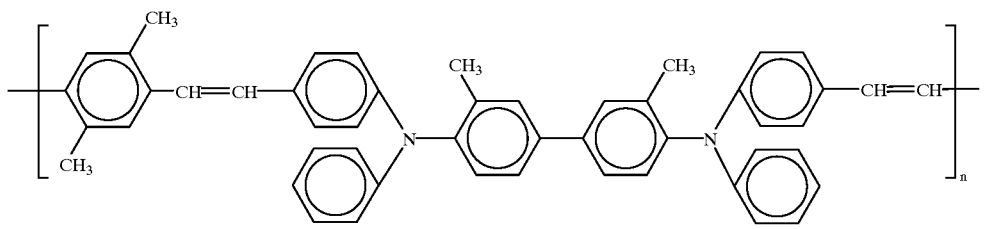
(II-26)
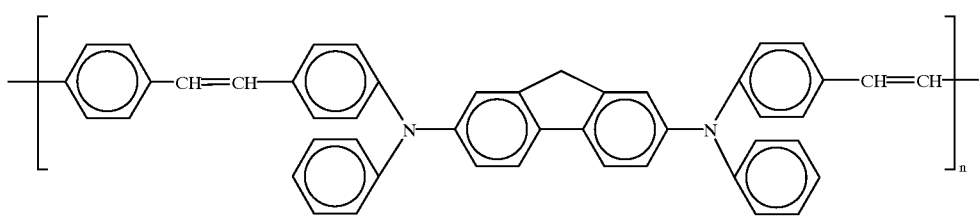
(II-27)
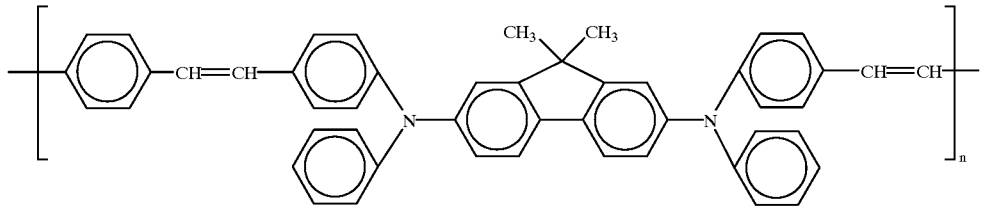
(II-28)

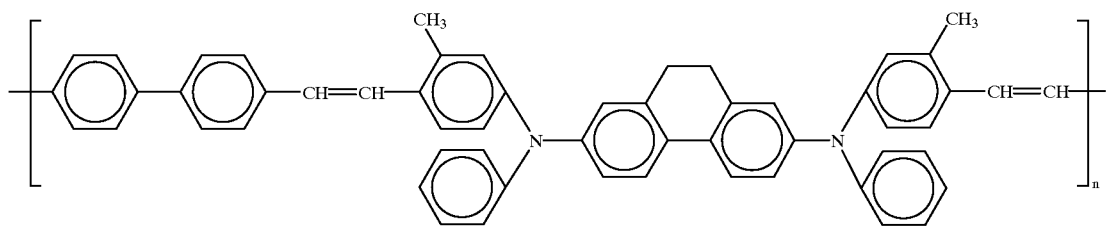
(II-29)
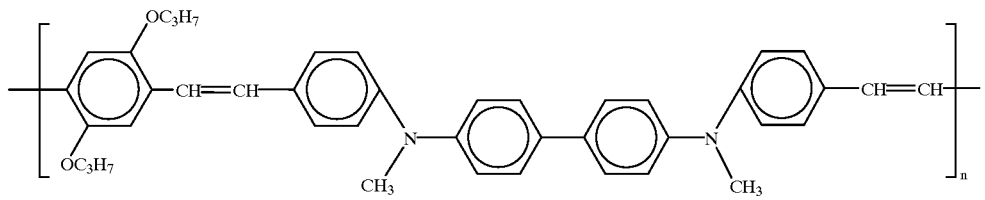
(II-30)
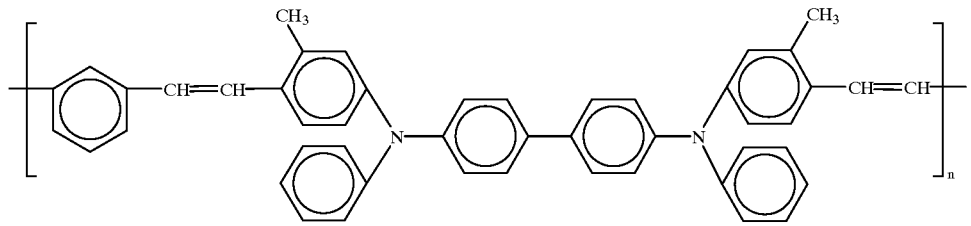
(II-31)
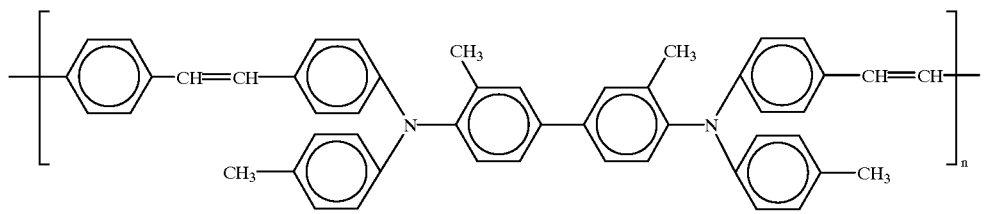
(II-32)
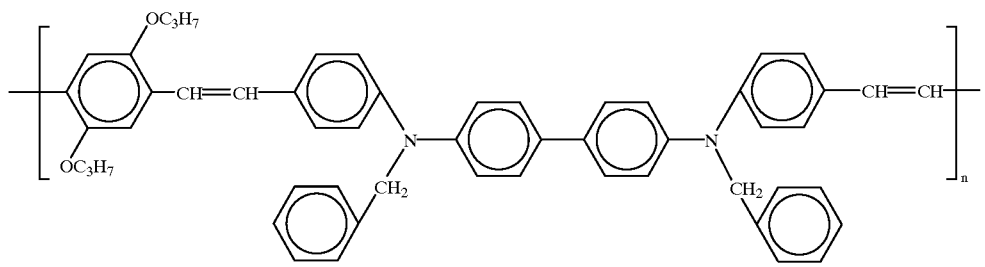
(II-33)
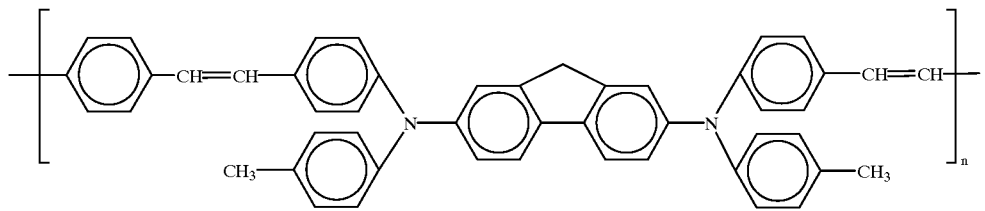
(II-34)

-continued
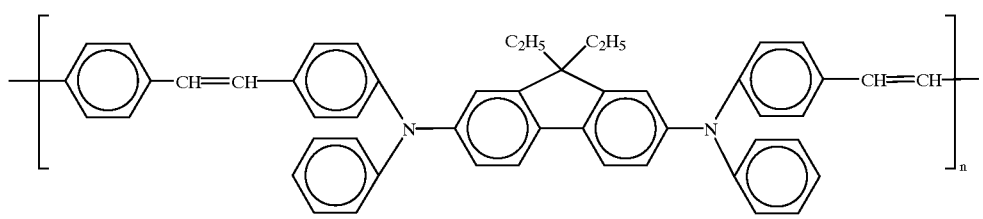
(II-35)
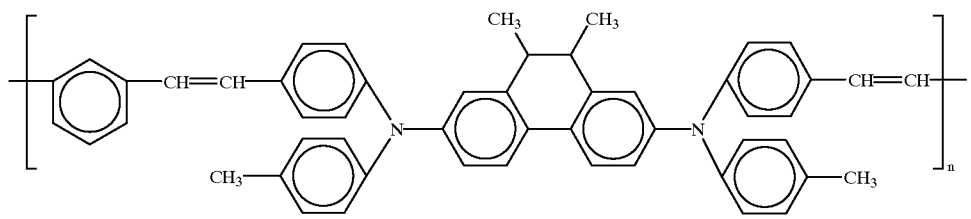
(II-36)
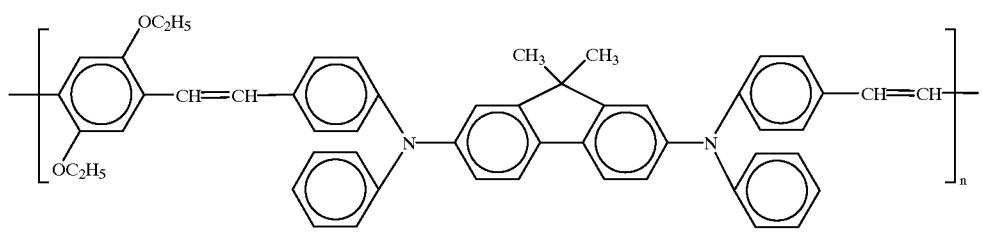
(II-37)
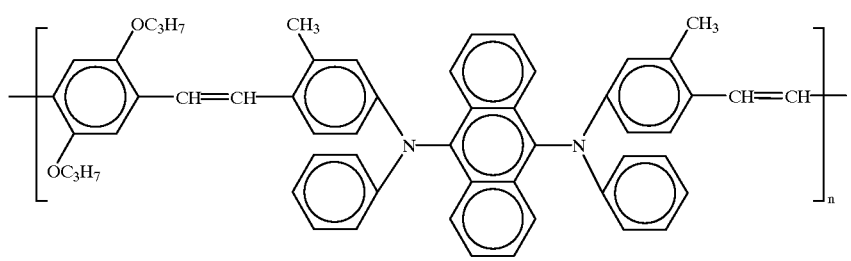
(II-38)
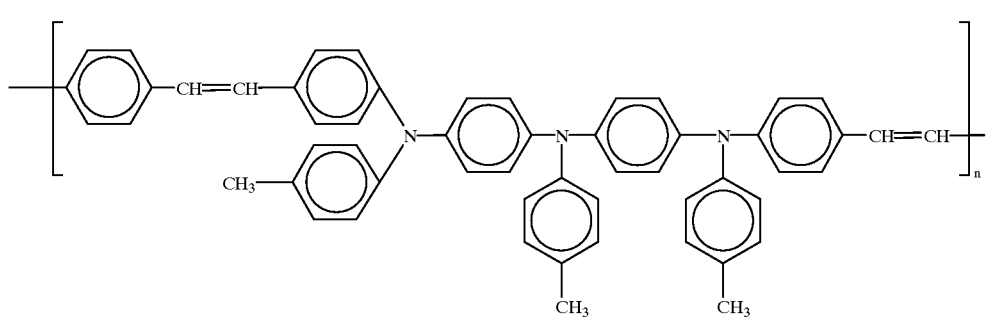
(II-39)
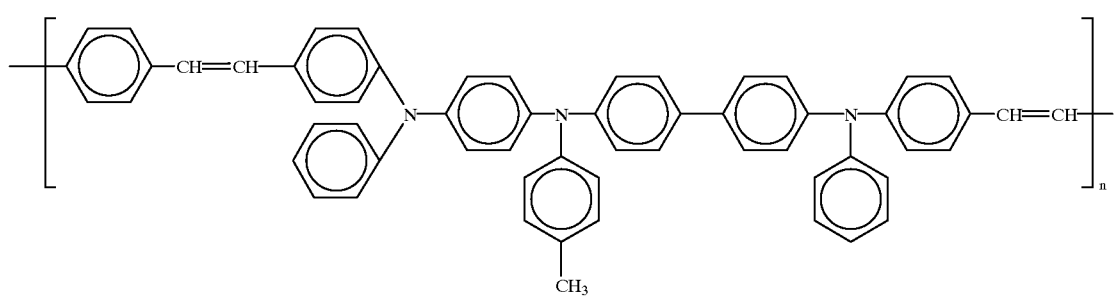
(II-40)

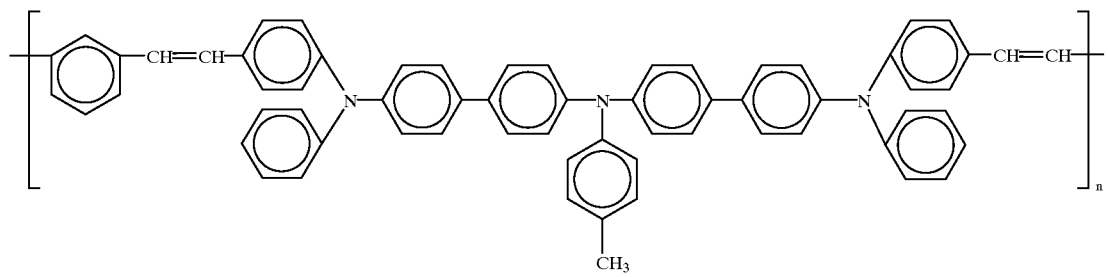
(II-41)
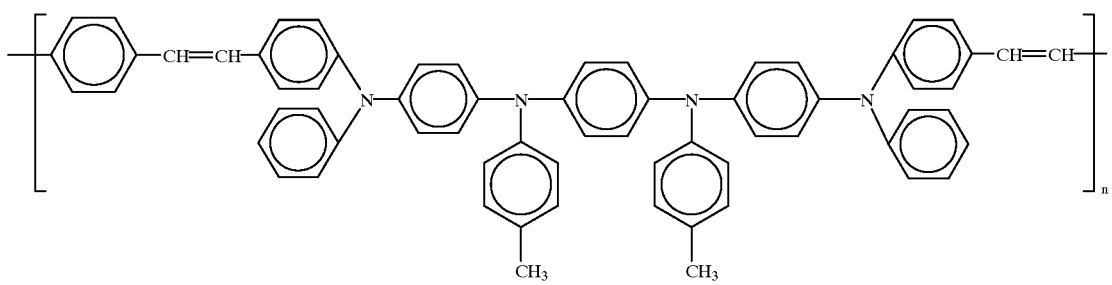
(II-42)
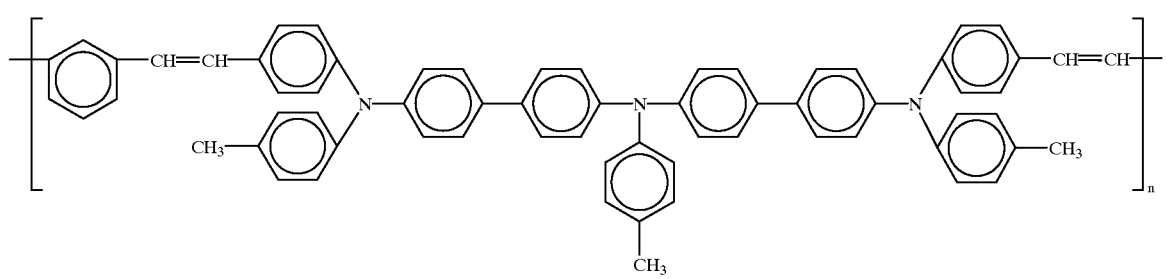
(II-43)
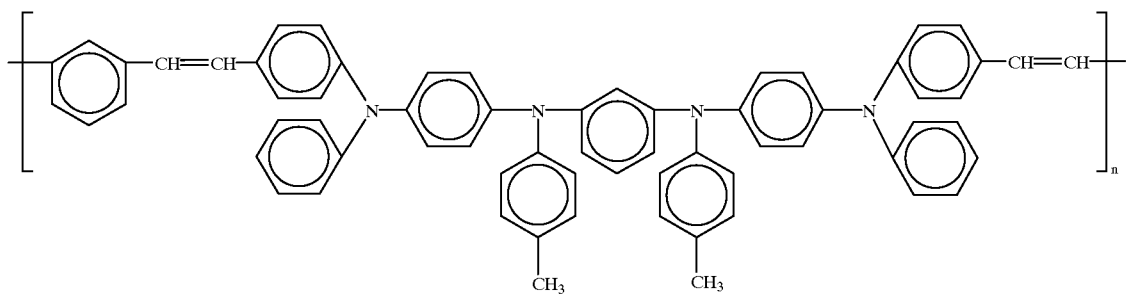
(II-44)
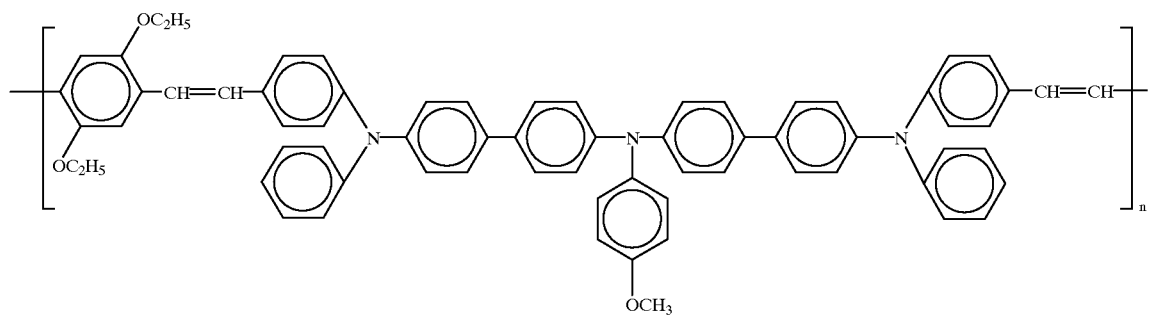
(II-45)

The styryl polymer compounds represented by the chemical formulas (I) and (II) have a photoconductive function, a charge transporting function and a luminous function. Therefore, the styryl polymer compounds (I) and (II) are suitable for application to an organic photosensitive member and an organic electroluminescence element.

First, it will be explained the case where the styryl polymer compounds (I) and (II) of the present invention are applied to an organic photosensitive member and then to an organic electroluminescence element.

The styryl polymer compounds represented by the chemical formulas (I) and (II) can be applied to any layer in an organic photosensitive member for electrophotography. It is desirable that the present styryl polymer compounds (I) and (II) are used as a charge-transporting material because of its high charge transporting ability.

The styryl polymer compound of the present invention works as a charge transporting material and can transport very effectively electrical charges generated by light absorption or injected from an electrode. Therefore, the styryl polymer compound of the present invention can provide a photosensitive member excellent in sensitivity and speedy responsibility. The styryl polymer compound is also excellent in resistance to ozone and light-stability, so that it can also provide a photosensitive member excellent in durability.

A photosensitive member, various types of which are known, may be any type in the invention. For example, a photosensitive member may be a monolayer type in which a photosensitive layer is formed on an electrically conductive substrate by dispersing a charge generating material and a charge transporting material in a binder resin; a laminated type in which a photosensitive layer is formed by laminating a charge generating layer and a charge transporting layer on the electrically conductive substrate; a photosensitive member in which an undercoating layer and/or an electrically conductive layer are formed on a substrate and a photosensitive layer is formed thereon; a photosensitive member in which an undercoating layer, a photosensitive layer and a surface protective layer are formed on a substrate in the order.

An electrically conductive substrate is exemplified by a sheet or a drum made of metal or alloy such as copper, aluminum, silver, iron and nickel; a substrate such as a plastic film on which the foregoing metal or alloy is adhered by a vacuum-deposition method or an electroless plating method and the like; a substrate such as a plastic film and paper on which an electroconductive layer is formed by applying or depositing electroconductive polymer, indium oxide, tin oxide etc. In general, aluminum is used; for example, machined pipe in which an aluminum pipe processed by extruding and drawing aluminum is cut and the outer surface of pipe is cut by means of cutting weapon such as diamond bite to have a thickness of about 0.2 to 0.3 mm; DI pipe in which an aluminum disk is deep-drawed to make cup shape and the outer surface is subjected to ironing; EI pipe in which an aluminium disk is impact-processed to make cup shape and the outer surface is subjected to ironing; ED pipe in which cold drawing is carried out after extruding. The surface of those pipe may be further subjected to cutting treatment.

When an underlying layer is formed on the substrate, the surface of substrate is anodized to form an oxidized layer. It is effective to use an anodized layer as an underlying layer when the substrate is made of aluminum alloy. A solution with a resin dissolved in a solvent or a dispersion with a low electrical resistance material dispersed in the solution is applied to the substrate and dried to form an underlying layer. A material for forming an underlying layer is exemplified by polyimide, polyamide, nitrocellulose, polyvinyl butyral and polyvinyl alcohol. A low electrical resistance material may be dispersed in the resin. The low electrical resistance material is exemplified by metal oxides such as tin oxide, titanium oxide, zinc oxide, zirconium oxide and magnesium oxide, and organic compounds such as organic pigments, electron-absorbing organic compounds, organic metal complex. A thickness of the underlying layer is about 0.1–5 $\mu$m, preferably about 0.2–3 $\mu$m.

Hereinafter, a photosensitive member in which a charge generating layer and a charge transporting layer are laminated to form a photosensitive layer is explained as an example.

When a charge generating layer is formed on an electrically substrate, a charge generating material is deposited in a vacuum on the electrically conductive substrate, a charge generating material is dissolved in an adequate solvent to apply onto the electrically conductive substrate or an application solution containing a charge generating material and, if necessary, binder resin dissolved in an appropriate solvent is applied onto the electrically conductive substrate to be dried, for the formation of a charge generating layer on the electrically conductive substrate. From the viewpoint of adhesivity, a preferable photosensitive layer is the one in which a charge generating layer is dispersed in a binder resin. A thickness of charge generating layer is 0.01 to 2 $\mu$m, preferably 0.05 to 1 $\mu$m. An amount of the binder resin used for formation of the charge generating layer is preferably 100% by weight or less, but the mount is not intended to be limited. The binder resin may be in combination with two or more kind of resins.

A charge generating material useful for the formation of a photosensitive layer is exemplified by organic pigments or dyes such as bisazo dyes, triarylmethane dyes, thiazine dyes, oxazine dyes, xanthene dyes, cyanine coloring agents, styryl coloring agents, pyrylium dyes, thiapyrylium dyes, azo pigments, quinacridone pigments, indigo pigments, perylene pigments, polycyclic quinone pigments, bisbenzimidazole pigments, indanthrone pigments, squalylium pigments, azulene coloring agents, phthalocyanine pigments and pyrrolopyrrole. Any other material is also usable insofar as it generates charge carriers very efficiently upon absorption of light.

The binders for the production of a photosensitive layer may be exemplified by thermoplastic resins such as saturated polyester, polyamide, acrylic, ethylene-vinyl acetate copolymer, ion cross-linked olefin copolymer (ionomer), styrene-butadiene block copolymer, polyarylate, polycarbonate, vinyl chloride-vinyl acetate copolymer, cellulose ester, polyimide, styrol resin, polyacetal resin, phenoxy resin; thermosetting resins such as epoxy resin, urethane resin, silicone resin, phenolic resin, melamine resin, xylene resin, alkyd resin, thermosetting acrylic resin, etc., and photocuring resins, and photoconductive resins such as poly-N-vinyl carbazole, polyvinyl pyrene, polyvinyl anthracene, polyvinylpyrrole, etc., all named without any significance of restricting the use of them. Any of these resins can be used singly or in combination with other resins.

A photosensitive solution with the above charge generating material dissolved or dispersed in an organic solvent such as the following is applied onto the electrically substrate to be dried to form a photosensitive layer. The organic solvent; alcohols such as methanol, ethanol, isopropanol; ketones such as acetone, methyl ethyl ketone and cylohexanone; amides such as N,N-dimethylformamide, and N,N- dimetylacetamide; sulfoxides such as dimethyl sulfoxide; ethers such as tetrahydrofuran, dioxiane and ethylene glycol monometyl ether; esters such as methyl acetate and ethyl acetate; halogenated bydrocarboans such as chloroform, methylene chloride, dicholoroethane, tetrachlorohydrocarbon, tricholoroethylene; aromatic hydrocarbons such as benzene, toluene, xylene, ligroin, monochlorobenzene, dichlorobenzene.

A charge transporting layer containing a charge transporting material and a binder resin is formed on the photosensitive layer to give a photosensitive member of the present invention.

The binders for the production of a charge transporting layer may be exemplified by thermoplastic resins such as polycarbonate, polyarylate, saturated polyester, polyamide, acrylic resin, ethylene-vinyl acetate copolymer, ion cross-linked olefin copolymer (ionomer), styrene-butadiene block copolymer, vinyl chloride-vinyl acetate copolymer, cellulose ester, polyimide, styrol resin, polyacetal resin, phenoxy resin; thermosetting resins such as epoxy resin, urethane resin, silicone resin, phenolic resin, melamine resin, xylene resin, alkyd resin, thermosetting acrylic resin, etc., and photocuring resins, and photoconductive resins such as poly-N-vinyl carbazole, polyvinyl pyrene, polyvinyl anthracene. all named without any significance of restricting the use of them. Any of these resins can be used singly or in combination with other resins.

When the charge transporting layer is formed, an application solution with the charge transporting layer and the binder resin dissolved in an adequate solvent is applied onto the charge generating layer and then dried. A thickness of charge transporting layer is 5 to 60 μm, preferably 10 to 50 μm. An amount of charge transporting material in the charge transporting layer is not particularly specified, but generally about 0.1 to 10 parts by weight, preferably 0.5 to 10 parts by weight.

The charge transporting material used in the photosensitive member is a compound represented by the general formula (I). The compound thereof may be singly or in combination. Charge transporting compounds (I) or (II) may be used in combination with the conventional charge transporting material.

The conventional charge transporting materials used in the present invention may be exemplified by hole-transporting materials such as hydrazone compounds, pyrazoline compounds, styryl polymer compounds, triphenylmethane compounds, oxadiazol compounds, carbazole compounds, stilbene compounds, enamine compounds, oxazole compounds, triphenylamine compounds and tetraphenylbenzidine, azine compounds; electron transporting materials such as fluorenone compounds, anthraquinodimethane compounds, diphenoquinone compounds, stilbenequinone compounds, thiopyrandioxide compounds, oxiadiazole compounds, perylene tetracarboxylic acids, fluorenylenemethane compounds, anthraquinone compounds, anthrone compounds, cyanovinyl compounds.

The solvents used for formation of the charge transporting layer may be exemplified by aromatic solvents such as benzene, toluene, xylene, chlorobenzerne; ketones such as acetone, methyl ethyl ketone and cyclohexanone; alcohols such as methanol, ethanol and isopropanol; esters such as ethyl acetate and ethyl Cellosolve; halogenated hydrocarbons suvh as tetrachloromethane, tetrabromomethane, chloroform, dichloromethane and tetrachloroethane; ethers such as tetrahydrofuran and dioxane; sulfoxides such as dimethylformamide, dimethylsulfoxide and diethylformamide. Such a solvent may be used singly or in combination.

The formation of a photosensitive layer, and a charge transporting layer and charge generating layer can be carried out by means of a known methods, such as a dipping-coating method, a spray-coating method, a spinner-coating method, a blade-coating method, a roller-coating method and a wire-bar coating method.

Other known agent, such as an agent for improving layer-formation properties or flexibility and an agent for controlling accumulation of residual potential may be added into a photosensitive layer, or a charge transporting layer in the case of a laminated type.

A photosensitive layer, in particular, a charge transporting layer, of the present invention, may contain an anti-oxidant for preventing ozone-degradation. The anti-oxidant is exemplified by hindered phenols, hindered amines, paraphenylene diamines, hydroquinones, spirichromans, spiroindanones, hydroquinolines, derivatives thereof and organic sulfur compounds.

The photosensitive member of the present invention may have an electrically conductive layer between a substrate and an undercoating layer. The electrically conductive layer may be exemplified by a dispersion layer with metal such aluminum, iron and nickel dispersed in a resin, or a dispersion layer with a metal oxide such as electrically conductive tin oxide, titanium oxide, antimony oxide, zirconium oxide, ITO (solid solution of indium or tin oxide) dispersed in a resin.

The photosensitive member of the present invention may have a surface protective layer on a photosensitive layer. A thickness of the surface protective layer is desirably 5 μm or less. As a material for formation of the surface protective layer may be exemplified by an acrylic resin, a polyaryl resin, a polycarbonate resin, an urethane resin, a thermosetting resin, a photocrable resin. Those resin may be used singly or in combination with low electrical resistant material such as tin oxide and indium oxide dispersed therein. An organic plasma polymer may be used as a surface protective layer. The organic plasma polymer may be oxygen, nitrogen, or an atom of III group or V group in the periodic law, if necessary.

Then, the compound represented by the general formula (I) or (II) is explained to be applied to an organic electroluminescence element. Examples of constructions of the organic electroluminescence elements of the present invention are shown scematically in FIGS. 1 to 4.

In FIG. 1, the reference number 1 is an anode. On the anode, a hole-injection transporting layer 2, an organic luminous layer 3 and a cathode 4 are laminated in the order. The hole-injection transporting layer contains a syryl polymer represented by the above-mentioned general formula (I) and/or (II).

Figure 2:
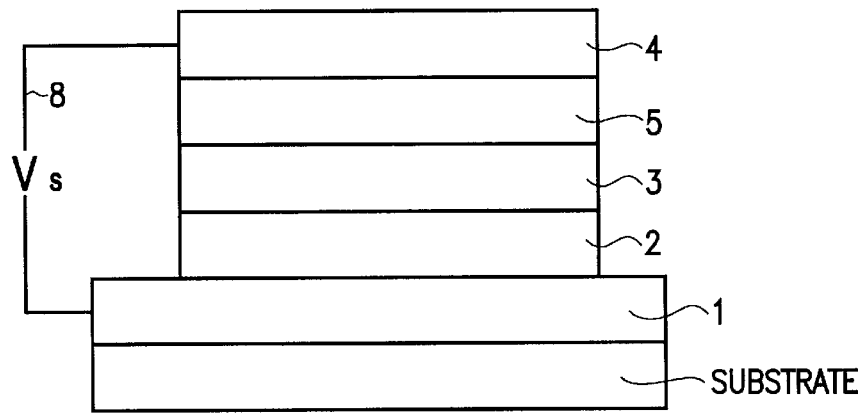
FIG. 2 is a schematic sectional view illustrating one embodiment of organic electroluminescence elements.

In FIG. 2, the reference number 1 is an anode. On the anode, a hole-injection transporting layer 2, an organic luminous layer 3, an electron-injection transporting layer 5 and a cathode are laminated in the order. The above-mentioned hole-injection transporting layer contains a styry polymer compound represented by the above-mentioned general formula (I) and/or (II).

Figure 3:
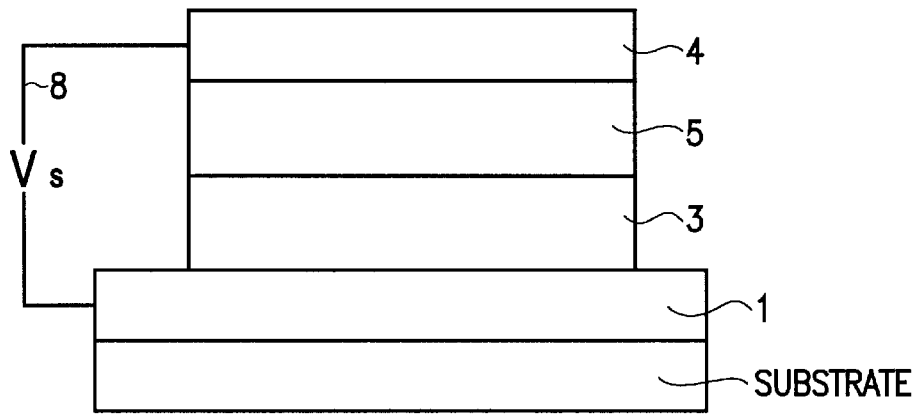
FIG. 3 is a schematic sectional view illustrating one embodiment of organic electroluminescence elements.

In FIG. 3, the reference number 1 is an anode. On the anode, an organic luminous layer 3, an electron-injection transporting layer 5 and a cathode 4 are laminated in the order. The above-mentioned organic luminous layer contains a styryl polymer compound represented by the above-mentioned general formula (I) and/or (II).

Figure 4:
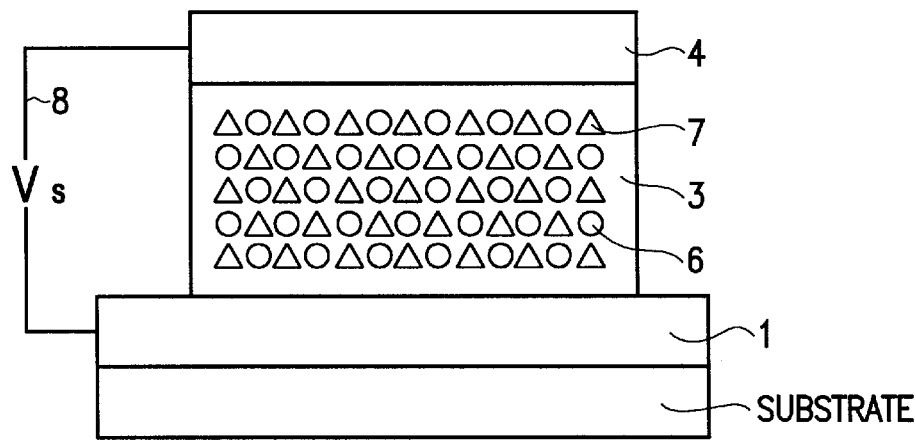
FIG. 4 is a schematic sectional view illustrating one embodiment of organic electroluminescence elements.

In FIG. 4, the reference number 1 is an anode. On the anode, an organic luminous layer 3 and a cathode 4 are laminated in the order. The organic luminous layer contains an organic luminous material 6 and a charge-transporting material 7. A styryl polymer compound represented by the above-mentioned general formula (I) and/or (II) is used for the charge-transporting material.

In the organic electroluminescence element having the above-mentioned costruction, an anode 1 and a cathode 4 are connected by a leading wire 8. An organic luminous layer emits light by applying voltage to the anode 1 and the cathode 4.

A known luminous material, an ancilliary material or a charge transporting material for assisting carrier transportation may be contained in the luminous layer, hole-injection transporting layer, or electron-injection transporting layer.

A specific compound represented by the general formula (I) or (II) has a small ionization potential and has a high hole-transportable ability. Therefore, the voltage required for starting emission in the organic electroluminescence element of the present invention may be low, which makes it possible to emit light stably and for a long time. Further, it is also considered that, when the styryl polymer compound is used as an organic luminous material, a function of the styryl polymer compound itself as a luminous material and heat stability contribute to them.

It is preferred that a conductive substance to be used for an anode 1 of the organic electroluminescence element has a work function of more than 4 eV. Conductive substances such as carbon, aluminium, vanadium, iron, cobalt, nickel, copper, zinc, tungusten, silver, tin, gold, etc., and an alloy thereof, tin oxide, indium oxide, antimony oxide, zinc oxide or zirconium oxide are used. Further, organic conductive resins such as polythiophene or polypyrrole are also used.

It is preferred that a metal for forming a cathode 4 has a work function of less than 4 eV. Magnesium, calcium, tin, lead, titanium, yttrium, lithium, gadolinium, ytterbium, ruthenium, manganese and an alloy thereof are used.

If necessary, a cathode and an anode may be formed by a multi-layer having two or more layers.

In the organic electroluminescence element, it is necessary that at least an anode 1 or a cathode 4 is a transparent electrode so that emission is observed. In this case, if the transparent electrode is used for the cathode, the transparency is easily deteriorated. Therefore, it is preferred that the transparent electrode is used for the anode.

When the transparent electrode is formed, it may be formed using the above-mentioned conductive substances, by means of vapor deposition, spattering, sol gel method, or applying resin in which the above conductive substance is dispersed, etc., so that the desired transparency and conductivity are secured.

The transparent substrate is not specifically limited as long as it has suitable strength, is not affected by heat due to deposition, etc. at the time of preparing an organic electroluminescence element, and is transparent. Examples thereof include glass substrate, transparent resin such as polyethylene, polypropylene, polyethersulfon or polyetherketone. As the transparent electrode formed on the glass substrate, commercially available ITO, NESA, etc., are known. They may also be used.

Using the above-mentioned electrode, the preparation of an organic electroluminescence element having the construction shown in FIG. 1 is to be illustratively explained.

First, an organic hole-injection transporting layer 2 is formed on the anode 1. The hole-injection transporting layer 2 can be formed by means of dip coating or spin coating of a solution in which a styryl polymer compound represented by the general formula (I) or (II) is dissolved, or a solution in which a styryl polymer compound represented by the general formula (I) or (II) is dissolved together with a suitable resin. In the case of coating methods, the thickness thereof is normally 5 to 1,000 nm.

The thicker the thickness of the layer, the higher the applied voltage is required, which results in the degradation of luminous efficiency. The deterioration of an electroluminescence element is liable to occur. If the thickness of the layer is smaller, the luminous efficiency is improved, however, the electroluminescence element easily causes breakdown, which shortens its life.

A charge transporting material represented by the general formula (I) and/or (II) may be used in combination of other charge-transporting materials. Examples of the charge-transporting material include a compound having an excellent hole-injection effect to a luminous layer or a luminous material, preventing an exciton produced in the luminous layer from moving toward an electron-injection layer or an electron-transporting material, and also having an excellent layer-forming ability.

Specifically, a phthalocyanine compound, a naphthalocyanine compound, a porphyrin compound, oxadiazole, triazole, imidazole, imidazolone, imidazolethione, pyrazoline, pyrazolone, tetrahydroimidazole, oxazole, oxadiazole, hydrazone, acylhydrazone, polyarylalkane, stilbene, butadiene, benzidine-type triarylamine, diamine-type triarylamine, etc., and a derivative thereof, and polyvinylcarbazole, polysilane, a high polymeric material such as a conductive high polymer are exemplified. However, it is not limited to them.

Examples of an organic luminous material and an auxiliary luminous material to be used for the organic luminous layer 3 include those which are known to the art. For example, epidorisin, 2,5-bis[5,7-di-t-pentyl-2-benzoxazolyl]thiophene, 2,2'-(1,4-phenylenedivinylene) bisbenzothiazole, 2,2'-(4,4'-biphenylene)bisbenzothiazole, 5-methyl-2-{2-[4-(5-methyl-2-benzoxazolyl)phenyl]vinyl}benzoxazole, 2,5-bis(5-methyl-2-benzoxazolyl)thiophene, anthracene, naphthalene, phenanthrene, pyrene, chrysene, perylene, perynone, 1,4-diphenylbutadiene, tetraphenylbutadiene, coumarin, acridine, stilbene, 2-(4-biphenyl)-6-phenylbenzoxazole, aluminium trisoxine, magnesium bisoxine, bis(benzo-8-quinolinol)zinc, bis(2-methyl-8-quinolinol)aluminium oxide, indium trisoxine, aluminium tris(5-methyloxine), lithium oxine, gallium trisoxine, calcium bis(5-chloroxine), poly(zinc-bis(8-hydroxy-5-quinolinolyl) methane), dilithium epindolision, zinc bisoxine, 1,2-phthaloperynone, 1,2-naphthaloperynone and the like.

Further, conventional fluorescent dyes such as fluorescent coumarine dye, fluorescent perylene dye, rluorescent pyran dye, fluorescent thiopyran dye, fluorescent polymethine dye, fluorescent mecyanin dye, fluorescent imidazole dye, etc. can be used. Among them, chelating oxynoid compounds are particularly preferred.

An organic luminous layer may be composed of a single layer construction of the above-mentioned luminous substance. It may also be composed of a multi-layer construction in order to adjust the properties such as luminous color or luminous intesity. Further, the luminous layer may be formed with two or more luminous substances or doped with luminous substances.

An organic luminous layer 3 may be formed by means of vapor deposition with the above-mentioned luminous substance, or by means of dip coating or spin coating of a solution in which the above luminous substance is dissolved, or a solution in which the above luminous substance is dissolved together with a suitable resin. An styryl polymer compound represented by the general formula (I) or (II) can also be used as a luminous substance or an organic luminous layer.

In the case of formation of vapor deposition, a thickness thereof is normally 1 to 500 nm. In the case of formation of coating method, a thickness thereof is normally 5 to 1,000 nm.

The thicker the layer to be formed, the higher the applied voltage is required for emission, which results in the degradation of luminous efficiency. Accordingly, the deterioration of an electroluminescence element is liable to occur. Further, if the thickness of the layer is smaller, the luminous efficiency is improved, however, the electroluminescence element easily causes breakdown, which shortens its life.

Then, the above-mentioned cathode is formed on the organic luminous layer.

As described above, a case where, on an anode 1, an organic hole-injection transporting layer 2, a luminous layer 3, and a cathode 4 are laminated in the order to form an organic electroluminescence element was explained. The luminous layer 3 and the organic hole-injection transporting layer 2 and the anode 1 may be laminated in the order on the cathode 1. The luminous layer 3 and the organic electron-injection transporting layer 5 and the cathode 4 may be laminated in the order on the anode 1. The organic hole-injection transporting layer 2, the luminous layer 3, the organic electron-injection transporting layer 5 and the cathode 4 may be laminated in the order on the anode 1. The organic electron-injection transporting layer 5, the organic luminous layer 3, and the anode 1 may be laminated in the order on the cathode 4.

In a pair of transparent electrodes, a suitable leading wire (8) such as nichrome wire, gold wire, copper wire or platinum wire is connected to the electrodes. An organic electroluminescence element emits light by applying appropriate voltage to both electrodes.

Examples of the electron-transporting material to be used for forming an organic electron-injection transporting layer include a compound having an ability for transporting an electron, an excellent electron-injection effect to a luminous layer or a luminous substance, preventing an exciton generated in a luminous layer from moving to a hole injection layer or a hole transporting material, and being excellent in layer-forming ability.

Specifically, fluorenone, anthraquinodimethane, diphenoquinone, stilbenequinone, thiopyrandioxide, oxadiazole, perylenetetracarboxylic acid, fluorenylidene, methane, anthraquinone, anthrope, etc. and a derivative thereof.

The organte electroluminescence element of the present invention is applicable to various indicator devices or display devices etc.

The present invention is explained in more detail hereinafter. An organic electrolumininescence element of the present invention is to achieve improvement of luminous efficiency and luminous brightness, and long-life. Luminous materials, luminous ancillary materials, charge transporting materials, sensitizers, resins, electrode materials etc. and production method of electroluminescence element are not intended to be limited in the following examples.

Synthesis Example I-1 (synthesis of styryl polymer compound (I-2)

In a three-necked flask of 200 ml, an aldehyde compound (2.87 g) (0.01 mole) represented by the following formula:

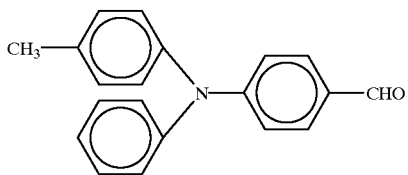

and chloromethylpolystyrene (triphenylphosphonium salt) of 4.15 g were dissolved in dimethylformamide (DMF) of 50 ml under nitrogen gas current. While the obtained solution was cooled at 5° C., a suspension solution containing potassium-t-butoxide of 1.68 g in 50 ml of DMF was added to the resultant solution for 1 hour. The obtained solution was stirred at room temperature for 12 hours. The reaction was carried out at 80° C. for 2 hours to be completed, The obtained mixture was added with cooled water of 500 ml and neutralized with dilute hydrochloric acid.

After 30 minutes, deposit was filtered. The filtered deposit was washed with water and dried. A solution with the dried deposit dissolved in tetrahydrofuran was poured into methanol to be deposited again for purification. This process was repeated three times to give the intended compound of 2.5 g.

Weight-average molecular weight of the obtained polymer was measured by means of gel permeation chromatography (GPC) to give 8370 in conversion of polystyrene.

Synthesis Example I-2 (synthesis of styryl polymer compound (I-10)

In a three-necked flask of 200 ml, an aldehyde compound (5.44 g) (0.01 mole) represented by the following formula:

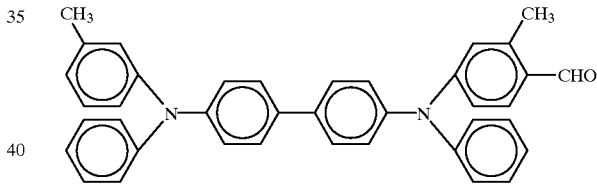

and chloromethylpolystyrene(triphenylphosphonium salt) of 4.15 g were dissolved in dirnethylformamide (DMF) of 50 ml under nitrogen gas current. While the obtained solution was cooled at 5° C., a suspension solution containing potassium-t-butoxide of 1.68 g in 50 ml of DMF was added to the resultant solution for 1 hour.

The obtained solution was stirred at room temperature for 12 hours. The reaction was carried out at 80° C. for 2 hours to be completed.

The obtained mixture was added with cooled water of 500 ml and neutralized with dilute hydrochloric acid.

After 30 minutes, deposit was filtered. The filtered deposit was washed with water and dried. A solution with the dried deposit dissolved in tetrahydrofuran was poured into methanol to be deposited again for purification. This process was repeated three times to give the intended compound of 5.3 g.

Weight-average molecular weight of the obtained polymer was measured by means of gel permeation chromatography (GPC) to give 5,900 in conversion of polystyrene.

Synthesis Example I-3 (synthesis of styryl polymer compound (I-27)

In a three-necked flask of 200 ml, an aldehyde compound (1.32 g) represented by the following formula:

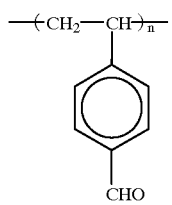

and 1-chloromethylpyrene(triphenylphosphonium salt) of 5.12 g (0.01 mole) were dissolved in dimethylfor amide (DMF) of 50 ml under nitrogen gas current.

While the obtained solution was cooled at 5° C., a suspension solution containing potassium-t-butoxide of 1.68 g in 50 ml of DMF was added to the resultant solution for 1 hour.

The obtained solution was stirred at room temperature for 12 hours. The reaction was carried out at 80° C. for 2 hours to be completed.

The obtained mixture was added with cooled water of 500 ml and neutralized with dilute hydrochloric acid.

After 30 minutes, deposit was filtered. The filtered deposit was washed with water and dried. A solution with the dried deposit dissolved in tetrahydrofuran was poured into methanol to be deposited again for purification. This process was repeated three times to give the intended compound of 2.0 g.

Weight-average molecular weight of the obtained polymer was measured by means of gel permeation chromatography (GPC) to give 4,700 in conversion of polystyrene.

Synthesis Example I-4 (synthesis of styryl polymer compound (I-32)

In a three-necked flask of 200 ml, an aldehyde compound (3.60 g) (0.01 mole) represented by the following formula:

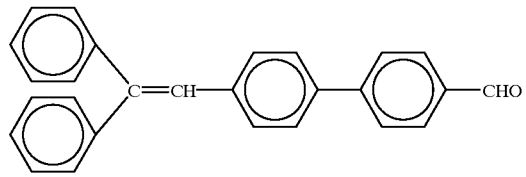

and 1-chloromethylpolystyrene(triphenylphosphonium salt) of 4.15 g (0.01 mole) were dissolved in dimethylformamide (DMF) of 50 ml under nitrogen gas current.

While the obtained solution was cooled at 5° C., a suspension solution containing potassium-t-butoxide of 1.68 g in 50 ml of DMF was added to the resultant solution for 1 hour.

The obtained solution was stirred at room temperature for 12 hours. The reaction was carried out at 80° C. for 2 hours to be completed.

The obtained mixture was added with cooled water of 500 ml and neutralized with dilute hydrochloric acid.

After 30 minutes, deposit was filtered. The filtered deposit was washed with water and dried. A solution with the dried deposit dissolved in tetrahydrofuran was poured into methanol to be deposited again for purification. This process was repeated three times to give the intended compound of 3.7 g.

Weight-average molecular weight of the obtained polymer was measured by means of gel permeation chromatography (GPC) to give 9,600 in conversion of polystyrene.

Synthesis Eample II-1 (synthesis of styryl polymer compound (II-3)

In a three-necked flask of 200 ml, a dialdehyde compound (3.15 g) (0.01 mole) represented by the following formula:

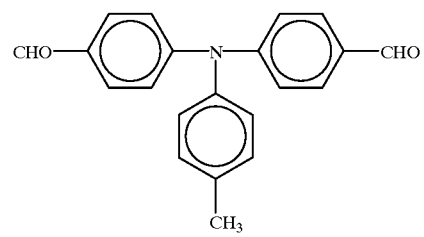

and m-xylene-bis(triphenylphosphonium bromide) of 7.88 g (0.01 mole) were dissolved in dimethylformamide (DMF) of 50 ml under nitrogen gas current.

While the obtained solution was cooled at 5° C., a suspension solution containing potassium-t-butoxide of 3.36 g in 50 ml of DMF was added to the resultant solution for 1 hour. The obtained solution was stirred at room temperature for 12 hours. The reaction was carried out at 80° C. for 2 hours to be completed.

The obtained mixture was added with cooled water of 500 ml and neutralized with dilute hydrochloric acid.

After 30 minutes, deposit was filtered. The filtered deposit was washed with water and dried. A solution with the dried deposit dissolved in tetrahydrofuran was poured into methanol to be deposited again for purification. This process was repeated three times to give the intended compound of 2.5 g.

Weight-average molecular weight of the obtained polymer was measured by means of gel permeation chromatography (GPC) to give 5,600 in conversion of polystyrene.

Synthesis Example II-2 (synthesis of styryl polymer compound (II-23)

In a three-necked flask of 200 ml, a dialdehyde compound (5.72 g) (0.01 mole) represented by the following formula:

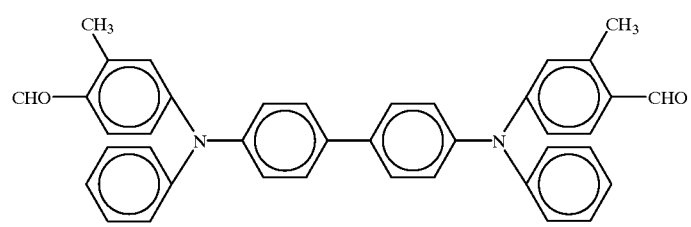

and p-xylene-bis(triphenylphosphonium bromide) of 7.88 g (0.01 mole) were dissolved in dimethylformamide (DMF) of 50 ml under nitrogen gas current.

While the obtained solution was cooled at 5° C., a suspension solution containing potassium-t-butoxide of 3.36 g in 50 ml of DMF was added to the resultant solution for 1 hour. The obtained solution was stirred at room temperature for 12 hours. The reaction was carried out at 80° C. for 2 hours to be completed.

The obtained mixture was added with cooled water of 500 ml and neutralized with dilute hydrochloric acid.

After 30 minutes, deposit was filtered. The filtered deposit was washed with water and dried. A solution with the dried deposit dissolved in tetrahydrofuran was poured into methanol to be deposited again for purification. This process was repeated three times to give the intended compound of 4.8 g.

Weight-average molecular weight of the obtained polymer was measured by means of gel permeation chromatography (GPC) to give 3,500 in conversion of polystyrene.

Synthesis Example II-3 (synthesis of styryl polymer compound (II-35)

In a three-necked flask of 200 ml, a dialdehyde compound (6.12 g) (0.01 mole) represented by the following formula:

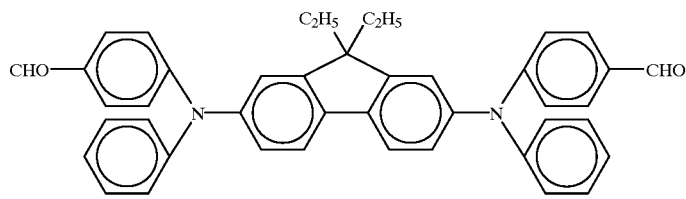

and p-xylene-bis(triphenylphosphonium bromide) of 7.88 g (0.01 mole) were dissolved in dimethylformamide (DMF) of 50 ml under nitrogen gas current.

While the obtained solution was cooled at 5° C., a suspension solution containing potassium-t-butoxide of 3.36 g in 50 ml of DMF wag added to the resultant solution for 1 hour. The obtained solution was stirred at room temperature for 12 hours. The reaction was carried out at 80° C. for 2 hours to be completed.

The obtained mixture was added with cooled water of 500 ml and neutralized with dilute hydrochloric acid.

After 30 minutes, deposit was filtered. The filtered deposit was washed with water and dried. A solution with the dried deposit dissolved in tetrahydrofuran was poured into methanol to be deposited again for purification. This process was repeated three times to give the intended compound of 5.0 g.

Weight-average molecular weight of the obtained polymer was measured by means of gel permeation chromatography (GPC) to give 3,200 in conversion of polystyrene.

Application of Charge Transporting Layer to Photosensitive Member for Electrophotography

EXAMPLE I-1

The trisazo compound (0.45 parts) represented by the chemical formula (A) below:

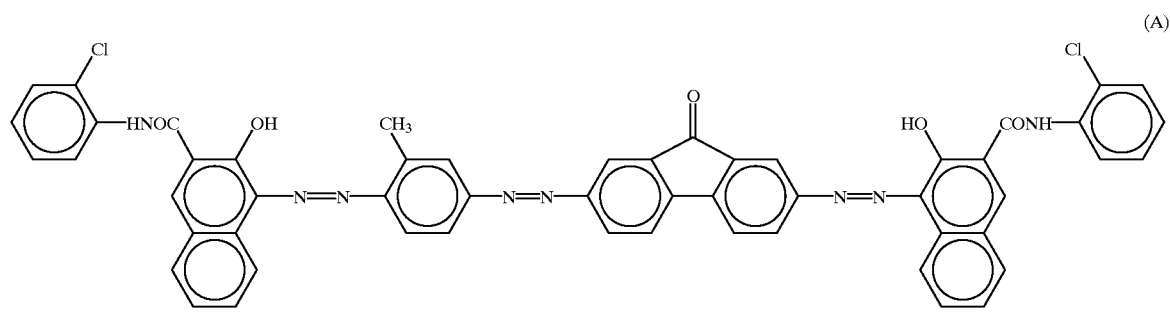

polyester resin (Vylon 200; made by Toyo Bouseki K.K.) of 0.45 parts (part means part by weight. Same hereinafter) and cyclohexanone of 50 parts were placed in Sand mill for dispersion.

The dispersion solution of the trisazo compound was applied onto an aluminum drum (80Φ) by means of a dipping method to form a charge generating layer so that a thickness of dried layer would be 0.3 g/m².

A solution containing the styryl polymer compound (I-2) of 90 parts, polycarbonate resin (Panlite K-1300; made by Teijin Kasei K.K.) of 10 parts dissolved in 1,4-dioxane of 400 parts was applied onto the charge generating layer to form a charge transporting layer so that a thickness of dried layer would be 20 microns. Thus, a photosensitive member with a photosensitive layer formed of two layers was prepared.

The resultant photosensitive member was installed in a copying machine (EP-5400; made by Minolta K.K.) and corona-charged by power of −6 KV level to evaluate initial surface potential $V_0$ (V), half-reducing amount ($E_{1/2}$ (lux.sec)) and dark decreasing ratio of the initial surface potential ($DDR_1$). $E_{1/2}$ means an exposure amount required to reduce the initial surface potential to half the value. $DDR_1$ is a decreasing ratio of the initial surface potential after the photosensitive member was left for 1 second in the dark.

EXAMPLES I-2 TO I-4

Photosensitive members were prepared in a manner similar to Example I-1, except that the styryl polymer compounds (I-3), (I-4) and (I-7) were used respectively instead of the styryl polymer compounds (I-2) used in Example I-1.

The resultant photosensitive members were evaluated in a manner similar to Example I-1 with respect to $V_0$, $E_{1/2}$ and $DDR_1$.

EXAMPLE I-5

The bisazo compound (0.45 parts) represented by the chemical formula (B) below:

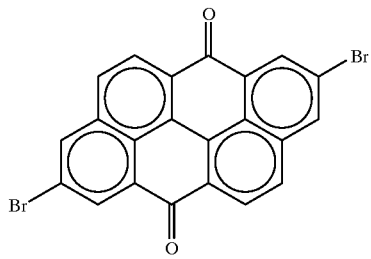

(C)

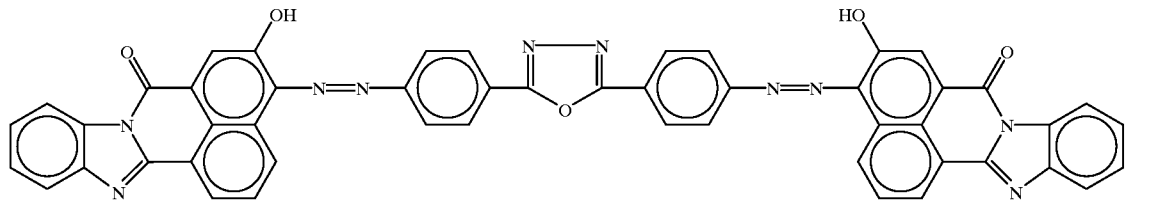

(B)

polystyrene resin (molecular weight; 40,000) of 0.45 parts and cyclohexanone of 50 parts were placed in Sand mill for dispersion.

The dispersion solution of the bisazo compound was applied onto an aluminum drum (80Φ) to form a charge generating layer so that a thickness of dried layer would be 0.3 g/m².

A solution containing the styryl polymer compound (I-8) of 80 parts, poly rylate resin (U-100; made by Yunichica K.K.) of 20 parts dissolved in 1,4-dioxane of 400 parts was applied onto the charge generating layer to form a charge transporting layer so that a thickness of dried layer would be 25 microns. Thus, a photosensitive member with a photosensitive layer formed of two layers was prepared.

The resultant photosensitive member was evaluated in a manner similar to Example I-1 with respect to $V_0$, $E_{1/2}$ and $DDR_1$.

EXAMPLES I-6 TO I-8

Photosensitive members were prepared in a manner similar to Example I-5, except that the styryl polymer compounds (I-9), (I-10) and (I-11) were used respectively instead of the styryl polymer compounds (I-8) used in Example I-5.

The resultant photosensitive members were evaluated in a manner similar to Example I-1 with respect to $V_0$, $E_{1/2}$ and $DDR_1$.

EXAMPLE I-9

The polycyclic quinone compound (0.45 parts) represented by the chemical formula (C) below:

polycarbonate resin (Panlite K-1300; made by Teijin Kasei K.K.) of 0.45 parts and dichloroethane of 50 parts were placed in Sand mill for dispersion.

The dispersion solution of the polycyclic quinone compound was applied onto an aluminum drum (80Φ) to form a charge generating layer so that a thickness of dried layer would be 0.4 g/m².

A solution containing the styryl polymer compound (I-12) of 60 parts, polyarylate resin (U-100; made by Yunichica K.K.) of 50 parts dissolved in 1,4-dioxane of 400 parts was applied onto the charge generating layer to form a charge transporting layer so that a thickness of dried layer would be 18 microns. Thus, a photosensitive member with a photosensitive layer formed of two layers was prepared.

The resultant photosensitive member was evaluated in a manner similar to Example I-1 with respect to $V_0$, $E_{1/2}$ and $DDR_1$.

EXAMPLES I-10 TO I-11

Photosensitive members were prepared in a manner similar to Example I-9, except that the styryl polymer compounds (I-13) and (I-14) were used respectively instead of the styryl polymer compounds (I-12) used in Example I-9.

The resultant photosensitive members were evaluated in a manner similar to Example I-1 with respect to $V_0$, $E_{1/2}$ and $DDR_1$.

EXAMPLE I-12

Titanyl phthalocyanine (0.45 parts), butyral resin (BX-1; made by Sekisui Kagaku Kogyo K.K.) of 0.45 parts and dichloroethane of 50 parts were placed in Sand mill for dispersion.

The dispersion solution of the phthalocyanine pigment was applied onto an aluminum drum (80Φ) by means of dipping method to form a charge generating layer so that a thickness of dried layer would be 0.3 μm.

A solution containing the styryl polymer compound (I-15) of 50 parts, polycarbonate resin (PC-Z; made by Mitsubishi Gas Kagaku K.K.) of 50 parts dissolved in 1,4-dioxane of 400 parts was applied onto the charge generating layer to form a charge transporting layer so that a thickness of dried layer would be 18 microns. Thus, a photosensitive member with a photosensitive layer formed of two layers was prepared.

The resultant photosensitive member was evaluated in a manner similar to Example I-1 with respect to $V_0$, $E_{1/2}$ and $DDR_1$.

EXAMPLE I-13

Copper phthalocyanine of 50 parts and tetraritro-copper phthalocyanine of 0.2 parts were dissolved in 98% conc. sulflic acid of 500 parts with stirring. The solution was poured into water of 5000 parts to deposit a photoconductive composition of copper phthalocyanine and tetranitro-copper phthalocyanine. The obtained composition was filtered, washed and dried at 120° C. under vacuum conditions.

The photosensitive composition obtained above of 10 parts, thermosetting acrylic resin (Acrydick A405; made by Dainippon Ink K.K.) of 22.5 parts, mnelamine resin (Super Beckamine J 820; made by Dainippon Ink K.K.) of 7.5 parts, the styryl polymer compound (I-17) of 15 parts and mixed solution of methyl ethyl ketone and xylene (I1 1) of 100 parts were placed in a ball mill pot for dispersion. The mixture was mixed for dispersion for 48 hours to give a photosensitive application solution. The application solution was applied by means of spray method onto an aluminum drum (80Φ) and dried. To form a photosensitive layer having thickness of about 15 microns. Thus, a monolayer photosensitive mnember was prepared.

The resultant photosensitive member was evaluated in a manner similar to Example I-$_1$ with respect to $V_0$, $E_{1/2}$ and $DDR_1$, except that corona charging was carried out at +6 Kv.

EXAMPLES I-14 TO I-15

Photosensitive members were prepared in a manner similar to Example I-13, except that the styryl polymer compounds (I-18) and (I-20) were used respectively instead of the styryl polymer compound (I-17) used in Example I-13.

The resultant photosensitive members were valuated in a manner similar to Example I-13 with respect to $V_0$, $E_{1/2}$ and $DDR_1$.

The results of mesurements of $V_0$, $E_{1/2}$ and $DDR_1$ of the photosensitive members obtained in Examples 1 to 15 are shown in Table I-1.

TABLE I-1

|  | VO(V) | E½(Lux · sec) | DDR¹(%) |
|---|---|---|---|
| Example I-1 | −660 | 1.0 | 2.7 |
| Example I-2 | −650 | 0.9 | 3.0 |
| Example I-3 | −650 | 0.8 | 3.5 |
| Example I-4 | −650 | 1.1 | 3.2 |
| Example I-5 | −660 | 1.0 | 2.8 |
| Example I-6 | −660 | 0.9 | 3.0 |
| Example I-7 | −660 | 0.8 | 3.1 |
| Example I-8 | −660 | 0.8 | 2.7 |
| Example I-9 | −650 | 0.9 | 3.4 |
| Example I-10 | −660 | 0.8 | 2.8 |
| Example I-11 | −650 | 1.0 | 3.1 |
| Example I-12 | −660 | 0.8 | 3.0 |
| Example I-13 | +660 | 0.9 | 2.8 |
| Example I-14 | +660 | 0.8 | 2.9 |
| Example I-15 | +660 | 1.0 | 2.7 |

As shown in Table I-1, the photosensitive members of the present invention, including a laminated type or monolayer type, have an ecellent charge-keeping ability and a small dark decreasing ratio which is sufficiently small to be put into practical use as a photosensitive member, and is excellent in sensitivity.

With respect to the photosensitive member of Example I-13, repetition copying test of positive charging was carried out by copying machine (EP-350Z; made by Minolta K.K.) available in the market. Even after 1,000 times of copying, initial copied images and final copied images showed excellent gradation, no degradation of sensitivity and clear images. The photosensitive member of the present invention was stable in repetition properties.

EXAMPLE II-1

The trisazo compound (0.45 parts) represented by the chemical formula (A) below:

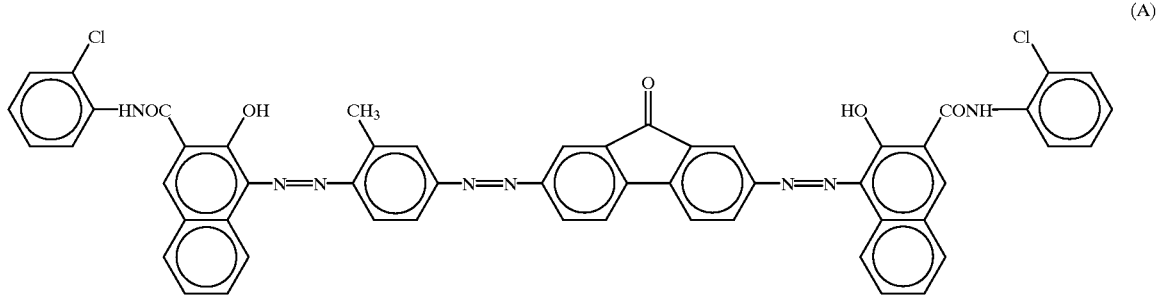

(A)

polyester resin (Vylon 200; made by Toyo Bouseki K.K.) of 0.45 parts and cyclohexanone of 50 parts were placed in Sand mill for dispersion.

The dispersion solution of the trisazo compound was applied onto an aluminum drum (80Φ) by means of a dipping method to form a charge generating layer so that a thickness of dried layer would be 0.3 g/m².

A solution containing the styryl polymer compound (II-3) of 80 parts, polycarbonate resin (Panlite K-1300; made by Teijin Kasei K.K.) of 20 parts dissolved in 1,4-dioxane of 400 parts was applied onto the charge generating layer to form a charge transporting layer so that a thickness of dried layer would be 20 microns. Thus, a photosensitive member with a photosensitive layer formed of two layers was prepared.

The resultant photosensitive member was installed in a copying machine (EP-5400; made by Minolta K.K.) and corona-charged by power of −6 KV level to evaluate initial surface potential $V_0$ (V), half-reducing amount ($E_{1/2}$ (lux.sec)) and dark decreasing ratio of the initial surface potential ($DDR_1$). $E_{1/2}$ means on exposure amount required to reduce the initial surface potential to half the value. $DDR_1$ is a decreasing ratio of the initial surface potential after the photosensitive member was left for 1 second in the dark.

EXAMPLES II-2 TO II-4

Photosensitive members were prepared in a manner similar to Example II-1, except that the styryl polymer compounds (II-4), (II-5) and (II-11) were used respectively instead of the styryl polymer compounds (II-3) used in Example II-1.

The resultant photosensitive members were evaluated in a manner similar to Example II-1 with respect to $V_0$, $E_{1/2}$ and $DDR_1$.

EXAMPLE II-5

The bisazo compound (0.45 parts) represented by the chemical formula (B) below:

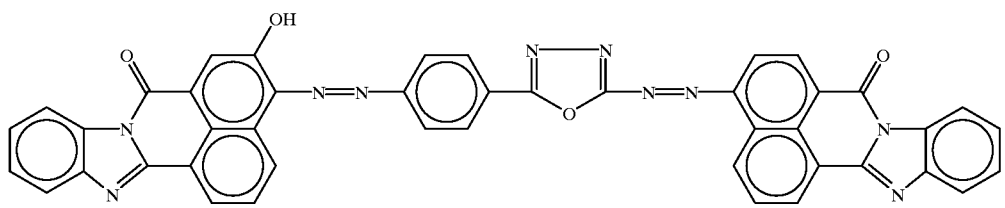

(B)

polystyrene resin (molecular weight; 40,000) of 0.45 parts and cyclohexanone of 50 parts were placed in Sand mill for dispersion.

The dispersion solution of the bisazo compound was applied onto an aluminum drum (80Φ) to form a charge generating layer so that a thickness of dried layer would be 0.3 g/m².

A solution containing the styryl polymer compound (II-13) of 90 parts, polyarylate resin (U-100; made by Yunichica K.K.) of 10 parts dissolved in 1,4-dioxane of 400 parts was applied onto the charge generating layer to form a charge transporting layer so that a thickness of dried layer would be 25 microns. Thus, a photosensitive member with a photosensitive layer formed of two layers was prepared.

The resultant photosensitive member was evaluated in a manner similar to Example II-1 with respect to $V_0$, $E_{1/2}$ and $DDR_1$.

EXAMPLES II-6 TO II-8

Photosensitive members were prepared in a manner similar to Example II-5, except that the styryl polymer compounds (II-17), (II-18) and (II-20) were used respectively instead of the styryl polymer compounds (II-13) used in Example II-5.

The resultant photosensitive members were evaluated in a manner similar to Example I-1 with respect to $V_0$, $E_{1/2}$ and $DDR_1$.

EXAMPLE II-9

The polycyclic quinone compound (0.45 parts) represented by the chemical formula (C) below:

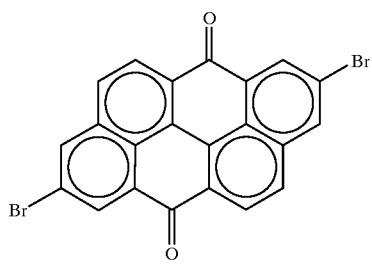

(C)

polycarbonate resin (Panlite K-1300; made by Teijin Kasei K.K.) of 0.45 parts and dichloroethane of 50 parts were placed in Sand mill for dispersion.

The dispersion solution of the polycyclic quinone compound was applied onto an aluminum drum (80Φ) to form a charge generating layer so that a thickness of dried layer would be 0.4 g/m².

A solution containing the styryl polymer compound (II-22) of 80 parts, polyarylate resin (U-100; made by Yunichica K.K.) of 20 parts dissolved in 1,4-dioxane of 400 parts was applied onto the charge generating layer to form a charge transporting layer so that a thickness of dried layer would be 18 microns. Thus, a photosensitive member with a photosensitive layer formed of two layers was prepared.

The resultant photosensitive member was evaluated in a manner similar to Example II-1 with respect to $V_0$, $E_{1/2}$ and $DDR_1$.

EXAMPLES II-10 TO II-11

Photosensitive members were prepared in a manner similar to Example II-9, except that the styryl polymer compounds (II-23) and (II-37) were used respectively instead of the styryl polymer compounds (II-22) used in Example II-9.

The resultant photosensitive members were evaluated in a manner similar to Example II-1 with respect to $V_0$, $E_{1/2}$ and $DDR_1$.

EXAMPLE II-12

Titanyl phthalocyanine (0.45 parts), butyral resin (BX-1; made by Sekisui Kagaku Kogyo K.K.) of 0.45 parts and dichloroetane of 50 parts were placed in Sand mill for dispersion.

The dispersion solution of the phthalocyanine pigment was applied onto an aluminum drum (80Φ) by means of dipping method to form a charge generating layer so that a thickness of dried layer would be 0.3 μm.

A solution containing the styryl polymer compound (II-32) of 50 parts, polycarbonate resin (PC-Z; made by Mitsubishi Gas Kagaku K.K.) of 50 parts dissolved in 1,4-dioxane of 400 parts was applied onto the charge generating layer to form a charge transporting layer so that a thickness of dried layer would be 18 microns. Thus, a photosensitive member with a photosensitive layer formed of two layers was prepared.

The resultant photosensitive member was evaluated in a manner similar to Example II-1 with respect to $V_0$, $E_{1/2}$ and $DDR_1$.

EXAMPLE II-13

Copper phthalocyanine of 50 parts and tetranitro-copper phthalocyanine of 0.2 parts were dissolved in 98% conc. sulflic acid of 500 parts with stirring. The solution was poured into water of 5,000 parts to deposit a photoconductive composition of copper phthalocyanine and tetranitro-copper phthalocyanine. The obtained composition was filtered, washed and dried at 120° C. under vacuum conditions.

The photosensitive composition obtained above of 10 parts, thermosetting acrylic resin (Acrydick A405; made by Dainippon Ink K.K.) of 22.5 parts, melamine resin (Super Beckamine J 820; made by Dainippon Ink K.K.) of 7.5 parts, the styryl polymer compound (II-35) of 15 parts and mixed solution of methyl ethyl ketone and xylene (1:1) of 100 parts were placed in a ball mill pot for dispersion. The mixture was mixed for dispersion for 48 hours to give a photosensitive application solution. The application solution was applied by means of spray method onto an aluminum drum (80Φ) and dried. To form a photosensitive layer having thickness of about 15 microns. Thus, a monolayer photosensitive member was prepared.

The resultant photosensitive member was evaluated in a manner similar to Example II-1 with respect to $V_0$, $E_{1/2}$ and $DDR_1$, except that corona charging was carried out at +6 Kv.

EXAMPLES II-14 TO II-15

Photosensitive members were prepared in a manner similar to Example II-13, except that the styryl polymer compounds (II-20) and (II-37) were used respectively instead of the styryl polymer compound (II-35) used in Example II-13.

The resultant photosensitive members were evaluated in a manner similar to Example II-13 with respect to $V_0$, $E_{1/2}$ and $DDR_1$.

The results of mesurements of $V_0$, $E_{1/2}$ and $DDR_1$ of the photosensitive members obtained in Examples 1 to 15 are shown in Table II-1.

TABLE II-1

|  | VO(V) | E½(Lux · sec) | $DDR_1$(%) |
|---|---|---|---|
| Example II-1 | −650 | 1.3 | 3.2 |
| Example II-2 | −660 | 1.2 | 2.8 |
| Example II-3 | −650 | 1.4 | 3.5 |
| Example II-4 | −660 | 1.1 | 3.2 |
| Example II-5 | −650 | 1.0 | 2.7 |
| Example II-6 | −660 | 1.3 | 3.2 |
| Example II-7 | −660 | 1.4 | 3.0 |
| Example II-8 | −650 | 1.0 | 2.8 |
| Example II-9 | −660 | 0.9 | 3.2 |
| Example II-10 | −660 | 1.1 | 2.9 |
| Example II-11 | −660 | 1.2 | 2.6 |

TABLE II-1-continued

|  | VO(V) | E½(Lux · sec) | $DDR_1$(%) |
|---|---|---|---|
| Example II-12 | −650 | 1.4 | 3.4 |
| Example II-13 | +660 | 0.9 | 3.0 |
| Example II-14 | +660 | 1.0 | 2.8 |
| Example II-15 | +660 | 1.2 | 2.9 |

As shown in Table II-1, the photosensitive members of the present invention, including a laminated type or monolayer type, have an ecellent charge-keeping ability and a small dark decreasing ratio which is sufficiently small to be put into practical use as a photosensitive member, and is excellent in sensitivity.

With respect to the photosensitive member of Example II-13, repetition copying test of positive charging was carried out by copying machine (EP-350Z; made by Minolta K.K.) available in the market. Even after 1,000 times of copying, initial copied images and final copied images showed excellent gradation, no degradation of sensitivity and clear images. The photosensitive member of the present invention was stable in repetition properties.

Application of Styryl Polymer Compound to Electroluminescence Element

EXAMPLE I-16

A styryl polymer compound (I-2) dissolved in a dichloromethane solution was applied by a spin coating method to a glass substrate coated with indium tin oxide, to form an organic hole-injection transporting layer, The obtained layer had a thickness of 50 nm.

Next, a layer having a thickness of 50 nm was formed by means of vacuum deposition with aluminum trisoxine serving as an organic luminous layer.

Lastly, a layer having a thickness of 200 nm was formed by means of vacuum deposition with magnesium to give a cathode.

In this way, an organic electroluminescence element device was prepared.

EXAMPLES I-17 TO I-19

An organic electroluminescence element was prepared in the same manner as in Example I-16 except that styryl polymer compounds (I-3), (I-7) and (I-9) were used instead of the styryl compound (I-2).

EXAMPLE I-20

A styryl polymer compound (I-10) in a dichloromethane solution was applied by a spin coating method to a glass substrate coated with indium tin oxide, to form an organic hole-injection transporting layer. The obtained layer had a thickness of 70 nm.

Next, a layer having a thickness of 100 nm was formed by means of vapor deposition with aluminum trisoxine serving as an organic luminous layer.

Further, a layer having a thickness of 50 nm was formed by means of vapor deposition with the following oxadiazole compound (D):

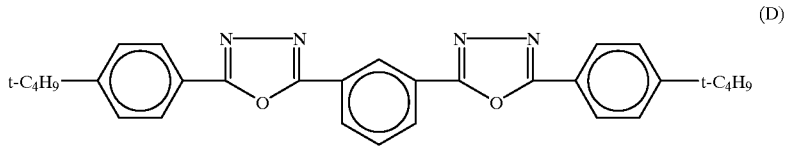

(D)

to serve as an electron-injection transporting layer.

Lastly, a layer having a thickness of 200 nm was formed by means of vapor deposition with magnesium to give a cathode.

In this way, an organic electroluminescence element was prepared.

EXAMPLES I-21 TO I-23

An organic electroluminescence element was prepared in the same manner as in Example I-20 except that styryl polymer compounds (I-11), (I-12) and (I-15) were used instead of the styryl polymer compound (I-10).

EXAMPLE I-24

A styryl polymer compound (I-22) in a dichloromethane solution was applied by a spin coating method to a glass substrate coated with indium tin oxide, to form an organic luminous layer. The obtained layer had a thickness of 50 nm.

Next, a layer having a thickness of 20 nm was formed by means of vapor deposition with an oxadiazole compound (D) serving as an organic electron-injection transporting layer.

Lastly, a layer having a thickness of 200 nm was formed by means of vapor deposition with Mg and Ag, the atomic ratio of which is 10:1, to give a cathode.

In this way, an organic electroluminescence element was prepared.

EXAMPLE I-25

A styryl polymrr compound (I-23) in a dichloromethane solution was applied by a spin coating method to a glass substrate coated with indium tin oxide, to form an organic hole-injection layer. The obtained layer had a thickness of 20 nm.

Further, N,N'-diphenyl-N,N'-(3-methylphenyl)-1,1'-biphenyl-4,4'-diamine was applied by vacuum deposition to give a hole-transporting layer having a thickness of 40 nm. Next, a layer having a thickness of 50 nm was formed by means of vapor deposition with tris(8-hydroxyquinoline) aluminum complex.

Lastly, a layer having a thickness of 200 nm was formed by means of vapor deposition with Mg and Ag, the atomic ratio of which is 10:1, to give a cathode.

In this way, an organic electroluminescence element was prepared.

EXAMPLES I-26 TO I-27

An organic electroluminescence element was prepared in the same manner as in Example I-25 except that styryl polymer compounds (I-24) and (I-25) were used instead of the styryl polymer compound (I-23).

EXAMPLE I-28

A styryl polymer compound (I-27) and N,N'-diphenyl-N, N'-(3-methylphenyl)-1,1'-biphenyl-4,4'-diamine were dissolved at a ratio of 1:1 in tetrahydrofuran.

The obtained solution was applied by a spin coating method to a glass substrate coated with indium tin oxide to form a luminous layer.

A layer having a thickness of 200 nm was formed by means of vapor deposition with Mg and Ag, the atomic ratio of which is 10:1, to give a cathode.

In this way, an organic electroluminescence element was prepared.

EXAMPLES I-29 TO I-30

An electroluminescence element was prepared in the same manner as in Example I-28 except that styryl compounds (I-29) and (I-32) were used instead of the styryl polymer compound (I-27).

Evaluation

The direct voltage was applied to the organic electroluminescence elements obtained in Examples (I-16) to (I-30) with the glass electrode as an anode to measure luminous brightness. The results are shown in Table I-2.

TABLE I-2

|  | brightness(cd/m$^2$) |
| --- | --- |
| Example I-16 | 650 |
| Example I-17 | 685 |
| Example I-18 | 702 |
| Example I-19 | 784 |
| Example I-20 | 805 |
| Example I-21 | 870 |
| Example I-22 | 821 |
| Example I-23 | 790 |
| Example I-24 | 860 |
| Example I-25 | 751 |
| Example I-26 | 632 |
| Example I-27 | 565 |
| Example I-28 | 496 |
| Example I-29 | 507 |
| Example I-30 | 459 |

As shown in Table I-2, an organic electroluminescence element of the present invention showed good luminous brightness even at low voltage.

The organic electroluminescence element of Example I-25 was driven continuously at a current density of 1 mA/cm$^2$. Luminous light was emitted stably for 200 hours or more.

EXAMPLE II-16

A styryl polymer compound (I-3) dissolved in a dichloromethane solution was applied by a spin coating method to a glass substrate coated with indium tin oxide, to form an organic hole-injection transporting layer. The obtained layer had a thickness of 50 nm.

Next, a layer having a thickness of 50 nm was formed by means of vacuum deposition with aluminum trisoxine serving as an organic luminous layer.

Lastly, a layer having a thickness of 200 nm was fored by means of vacuum deposition with magnesium to give a cathode.

In this way, an organic electroluminescence element device was prepared.

EXAMPLES II-17 TO II-19

An organic electroluminescence element was prepared in the same manner as in Example II-16 except that styryl polymer compounds (II-5), (II-6) and (II-7) were used instead of the styryl compound (II-3).

EXAMPLE II-20

A styryl polymer compound (II-11) in a dichloromethane solution was applied by a spin coating method to a glass substrate coated with indium tin oxide, to form an organic hole-injection transporting layer. The obtained layer had a thickness of 70 nm.

Next, a layer having a thickness of 100 nm was formed by means of vapor deposition with aluminum trisoxine serving as an organic luminous layer.

Further, a layer having a thickness of 50 nm was formed by means of vapor deposition with the following compound (D):

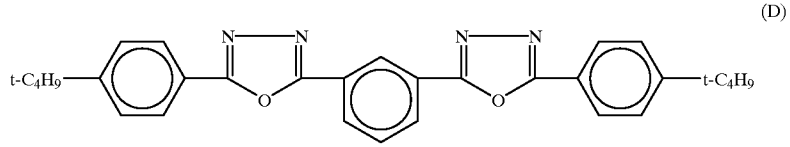

(D)

to serve as an electron-injection transporting layer.

Lastly, a layer having a thickness of 200 nm was formed by means of vapor deposition with magnesium to give a cathode.

In this way, an organic electroluminescence element was prepared.

EXAMPLES II-21 TO II-23

An organic electroluminescence element was prepared in the same manner as in Example II-20 except that styryl polymer compounds (I-15), (I-16) and (I-17) were used instead of the styryl polymer compound (I-11).

EXAMPLE II-24

A styryl polymer compound (II-23) was vapor-deposited on a glass substrate coated with indium tin oxide, to form an organic luminous layer. The obtained layer had a thickness of 50 nm.

Next, a layer having a thickness of 20 nm was formed by means of vapor deposition with an oxadiazole compound (D) serving as an organic electron-injection transporting layer.

Lastly, a layer having a thickness of 200 nm was formed by means of vapor deposition with Mg and Ag, the atomic ratio of which is 10:1, to give a cathode.

In this way, an organic electroluminescence element was prepared.

EXAMPLE II-25

A styryl polymrr compound (II-24) was applied by a spin coating method to a glass substrate coated with indium tin oxide, to form an organic hole-injection layer. The obtained layer had a thickness of 20 nm.

Further, N,N'-diphenyl-N,N'-(3-methylphenyl)-1,1'-biphenyl-4,4'-diamine was applied by vacuum deposition to give a hole-transporting layer having a thickness of 40 nm.

Next, a layer having a thickness of 50 nm was formed by means of vapor deposition with tris(8-hydroxyquinoline) aluminum complex.

Lastly, a layer having a thickness of 200 nm was formed by means of vapor deposition with mg and Ag, the atomic ratio of which is 10:1, to give a cathode.

In this way, an organic electroluminescence element was prepared.

EXAMPLE II-26

N,N'-diphenyl-N,N'-(3-methylphenyl)-1,1'-biphenyl-4,4'-diamine was vapor-deposited on a glass substrate coated with indium tin oxide to form a hole transporting layer having a thickness of 60 nm.

Tris(8-hydroxyquinoline)aluminum complex and styryl polymer compound (II-26) were dissolved at a ratio of 3:1 in dichloromethane.

The obtained solution was applied by a spin coating method to form a luminous layer having a thickness of 60 nm.

A layer having a thickness of 200 nm was formed by means of vapor deposition with Mg and Ag, the atomic ratio of which is 10:1, to give a cathode.

In this way, an organic electroluminescence element was prepared.

EXAMPLE II-27

A styryl polymer compound (II-32) in a dichloromethane solution was applied by a spin coating method to a glass substrate coated with indium tin oxide, to form a hole-injection layer. The obtained layer had a thickness of 50 nm.

Next, a layer having a thickness of 20 nm was formed by means of vapor deposition with tris(8-hydroxyquinoline) aluminum complex.

A layer having a thickness of 20 nm was formed by means of vapor deposition with an oxadiazole compound (D) serving as an organic electron-injection layer.

A layer having a thickness of 200 nm was formed by means of vapor deposition with Mg and Ag, the atomic ratio of which is 10:1, to give a cathode.

In this way, an organic electroluminescence element was prepared.

EXAMPLES II-28 TO II-29

An organic electroluminescence element was prepared in the same manner as in Example II-27 except that styryl polymer compounds (II-35) and (II-36) were used instead of the styryl polymer compound (II-32).

EXAMPLE II-30

A styryl polymer compound (II-38), tris(8-hydroxyquinoline)aluminum complex and polymethacrylate were dissolved at a ratio of 3:2:5 in tetrahydrofuran.

The obtained solution was applied by a spin coating method to a glass substrate coated with indium tin oxide to form a luminous layer having a thickness of 100 nm.

A layer having a thickness of 200 nm was formed by means of vapor deposition with Mg and Ag, the atomic ratio of which is 10:1, to give a cathode.

In this way, an organic electroluminescence element was prepared.

Evaluation

The direct voltage was applied to the organic electroluminescence elements obtained in Examples (II-16) to (II-30) with the glass electrode as an anode to measure luminous brightness. The results are shown in Table II-2.

TABLE II-2

|  | brightness(cd/m$^2$) |
|---|---|
| Example II-16 | 749 |
| Example II-17 | 782 |
| Example II-18 | 742 |
| Example II-19 | 765 |
| Example II-20 | 789 |
| Example II-21 | 806 |
| Example II-22 | 821 |
| Example II-23 | 817 |
| Example II-24 | 797 |
| Example II-25 | 851 |
| Example II-26 | 532 |
| Example II-27 | 465 |
| Example II-28 | 476 |
| Example II-29 | 492 |
| Example II-30 | 529 |

As shown in Table II-2, an organic electroluminescence element of the present invention showed good luminous brightness even at low voltage.

The organic electroluminescence element of Example II-25 was driven continuously at a current density of 1 mA/cm$^2$. Luminous light was emitted stably for 200 hours or more.

What is claimed is:

1. A styryl polymer, represented by the following formula (I):

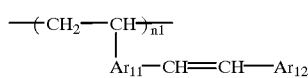 (I)

in which $Ar_{11}$ is an arylene group which may have a substituent; $Ar_{12}$ is an aryl group, a polycondensed ring group or a heterocyclic ring group, each of which may have a substituent; and $n_1$ is a natural number of 5 to 1000.

2. The styryl polymer of claim 1, in which $n_1$ is a natural number of 5 to 500.

3. A styryl polymer represented by the following formula (II):

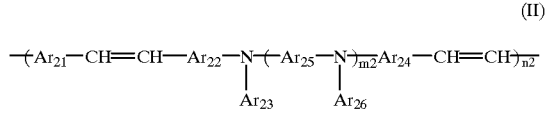 (II)

in which $Ar_{21}$, $Ar_{22}$, and $Ar_{24}$ are respectively an arylene group which may have a substituent; $Ar_{25}$ is an arylene group or a bivalent polycondensed ring group, each of which may have a substituent; $Ar_{23}$ and $Ar_{26}$ are respectively an alkyl group, an aralkyl group or an aryl group, each of which may have a substituent; $m_2$ is 0, 1, 2 or 3; and $n_2$ is a natural number of 5 to 1000.

4. The styryl polymer of claim 3, in which $n_2$ is a natural number of 10 to 1000.

5. The styryl polymer of claim 3, in which $m_2$ is 0 or 1.

6. A method of production of a styryl polymer represented by the following formula (I);

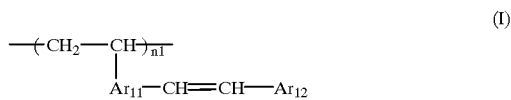 (I)

in which $Ar_{11}$ is an arylene group which may have a substituent; $Ar_{12}$ is an aryl group, a polycondensed ring group or a heterocyclic ring group, each of which may have a substituent; and $n_1$ is a natural number of 5 to 1000, in which a phosphorous compound represented by the following formula (III);

 (III)

in which $Ar_{11}$ and $n_1$ are the same as above; $X_1$ is $PO(OR_{11})_2$ or $P(R_{12})_3Y_1$ (in which $R_{11}$ is a lower alkyl group, $R_{12}$ is a cycloalkyl group or an aryl group; $Y_1$ is a halogen atom) is reacted with an aldehyde compound represented by the following formula (IV);

 (IV)

in which $Ar_{12}$ is the same as above.

7. A method of production of a styryl polymer represented by the following formula (I):

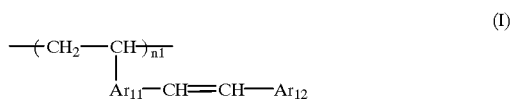 (I)

in which $Ar_{11}$ is an arylene group which may have a substituent; $Ar_{12}$ is an aryl group, a polycondensed ring group or a heterocyclic ring group, each of which may have a substituent; and $n_1$ is a natural number of 5 to 1000, in which an aldehyde compound represented by the following formula (V);

 (V)

in which $Ar_{11}$ and $n_1$ are the same as above, is reacted with an phosphorous compound represented by the following formula (VI);

 (VI)

in which $Ar_{12}$ is the same as above; $X_1$ is $PO(OR_{11})_2$ or $P(R_{12})_3Y_1$ (in which $R_{11}$ is a lower alkyl group, $R_{12}$ is a cycloalkyl group or an aryl group; $Y_1$ is a halogen atom).

8. A method of production of a styryl polymer represented by the following formula (II):

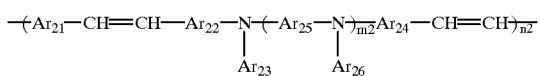
(II)

in which $Ar_{21}$, $Ar_{22}$, and $Ar_{24}$ are respectively an arylene group which may have a substituent; $Ar_{25}$ is an arylene group or a bivalent polycondensed ring group, each of which may have a substituent; $Ar_{23}$ and $Ar_{26}$ are respectively an alkyl group, an aralkyl group or an aryl group, each of which may have a substituent; $m_2$ is 0, 1, 2 or 3; and $n_2$ is a natural number of 5 to 1000, in which a phosphorous compound represented by the following formula (VII);

 (VII)

in which $Ar_{21}$ is the same as above; $X_2$ is $PO(OR_{21})_2$ or $P(R_{22})_3Y_2$ (in which $R_{21}$ is a lower alkyl group, $R_{22}$ is a cycloalkyl group or an aryl group; $Y_2$ is a halogen atom) is reacted with an aldehyde compound represented by the following formula (VIII);

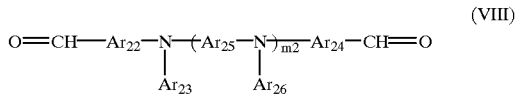
(VIII)

in which $Ar_{22}$, $Ar_{23}$, $Ar_{24}$, $Ar_{25}$, $Ar_{26}$, and $m_2$ are the same as above.

* * * * *